(12) United States Patent
Texier et al.

(10) Patent No.: US 12,443,897 B2
(45) Date of Patent: *Oct. 14, 2025

(54) DEVICE, SYSTEM AND METHOD CONTROLLING OPERATION OF A CLIENT DEVICE VIA AN INTERMEDIATION SERVER

(71) Applicant: AMADEUS S.A.S., Biot (FR)

(72) Inventors: Rodolphe Gregory Alexandre Texier, Vallauris (FR); Massimiliano Maini, Biot (FR); Herve Prezet, Mougin (FR)

(73) Assignee: AMADEUS S.A.S., Biot (FR)

( * ) Notice: Subject to any disclaimer, the term of this patent is extended or adjusted under 35 U.S.C. 154(b) by 545 days.

This patent is subject to a terminal disclaimer.

(21) Appl. No.: 17/561,189

(22) Filed: Dec. 23, 2021

(65) Prior Publication Data

US 2023/0206138 A1  Jun. 29, 2023

(51) Int. Cl.
*H04L 67/567* (2022.01)
*G06F 9/54* (2006.01)
(Continued)

(52) U.S. Cl.
CPC ............ *G06Q 10/02* (2013.01); *G06F 9/547* (2013.01); *G06Q 50/14* (2013.01)

(58) Field of Classification Search
None
See application file for complete search history.

(56) References Cited

U.S. PATENT DOCUMENTS 5,835,914 A  11/1998 Brim
6,243,761 B1  6/2001 Mogul et al.
(Continued)

FOREIGN PATENT DOCUMENTS

EP  3825946 A1  5/2021
EP  4202809 A1  6/2023
(Continued)

OTHER PUBLICATIONS https://web.archive.org/web/20221126231017/https://walkthechat.com/wechat-shops/ (Nov. 26, 2022).
https://web.archive.org/web/20230516004851/https://www.amazon.ca/stores/page/A3B67351-62AA-40CE-B6AB-7650FACA840D/ (May 16, 2023).
U.S. Appl. No. 18/373,444, Device, System and Method for Providing a Data Pathway Between a Client Device and a Provider System, filed Sep. 27, 2023.

*Primary Examiner* — Umut Onat
(74) *Attorney, Agent, or Firm* — PERRY + CURRIER INC.

(57) ABSTRACT

A device, system and method controlling operation of a client device via an intermediation server are provided. The server maintains indications of possible steps associated with respective provider systems, the possible steps comprising a subset given possible steps of a computing-process flow implemented at a client device in conjunction with communicating with provider systems. The server provides to one or more of the provider systems, a communication from the client device received in conjunction with implementing a given step of the computing-process flow, and receives, from a given provider system, a response to the communication. The server provides to the client device: the response; and an indication of one or more respective possible steps associated with the given provider system in the indications, the one or more respective possible steps for implementation at the client device in conjunction with receiving the response and implementing the computing-process flow.

18 Claims, 15 Drawing Sheets

(51) Int. Cl.
*G06Q 10/02* (2012.01)
*G06Q 50/14* (2012.01)
*H04L 67/01* (2022.01)

(56) References Cited

U.S. PATENT DOCUMENTS

| | | | |
|---|---|---|---|
| 6,470,383 | B1 | 10/2002 | Leshem et al. |
| 11,595,494 | B1* | 2/2023 | Texier ................. H04L 67/1097 |
| 2003/0005447 | A1* | 1/2003 | Rodriguez ......... H04N 21/4383 |
| | | | 348/E7.071 |
| 2009/0125715 | A1 | 5/2009 | Schuba et al. |
| 2010/0268557 | A1* | 10/2010 | Faith .................. G06Q 20/4016 |
| | | | 705/7.29 |
| 2011/0145087 | A1* | 6/2011 | Daman .................. H04L 67/02 |
| | | | 705/26.3 |
| 2012/0084105 | A1* | 4/2012 | Boeing ................. G06Q 10/02 |
| | | | 705/6 |
| 2013/0232506 | A1* | 9/2013 | Mazzoni ................. G06F 9/542 |
| | | | 719/313 |
| 2014/0058863 | A1* | 2/2014 | Biswas ................ G06Q 10/087 |
| | | | 235/375 |
| 2016/0203422 | A1* | 7/2016 | Demarchi ............... G06F 16/29 |
| | | | 705/6 |
| 2016/0378874 | A1 | 12/2016 | Jafri |
| 2017/0330110 | A1* | 11/2017 | Aurangabadkar ..... G06Q 10/02 |
| 2018/0182017 | A1 | 6/2018 | O'Neil-Dunne et al. |
| 2020/0379971 | A1 | 12/2020 | Hays et al. |
| 2020/0380425 | A1 | 12/2020 | Brun et al. |
| 2021/0049714 | A1* | 2/2021 | Shaaban ............ G06Q 10/1093 |
| 2021/0118030 | A1* | 4/2021 | Amadieu ........... G06Q 30/0619 |
| 2021/0166294 | A1 | 6/2021 | Landra et al. |
| 2021/0174266 | A1 | 6/2021 | Akrimi et al. |
| 2023/0206138 | A1 | 6/2023 | Textier et al. |

FOREIGN PATENT DOCUMENTS

| | | |
|---|---|---|
| FR | 2908578 A1 | 5/2008 |
| JP | 5549507 B2 | 7/2014 |
| WO | WO-2017004251 A1 | 1/2017 |

\* cited by examiner

| Provider System | Current Step | Possible Step(s) |
|---|---|---|
| 102-1 | 302-2 | 304-1 |
| 102-2 | 302-3 | 304-2 |

210

| Provider System | Predefined Data |
|---|---|
| 102-1 | 214-1 |
| 102-2 | 214-2 |

212

214-1
(HeaderInfo, String, False, "Limousine Pickup Service")
(Location, String, True, "Pick-up address")
(Time, TimeHHMM, True, "Pick-up time")
(AddlInfo, String, False, "Additional info")

214-2
(HeaderInfo, String, False, "Louvre Excursion")
(EventDate, DateDDMMYYY, True, "Date")
(GuideLanguage, String, True, "Audio Guide Language")

FIG. 5

DEVICE, SYSTEM AND METHOD CONTROLLING OPERATION OF A CLIENT DEVICE VIA AN INTERMEDIATION SERVER

FIELD

The specification relates generally to intermediation between devices, and specifically to a device, system and method for controlling operation of a client device via an intermediation server.

BACKGROUND

The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the extensible Markup Language (XML)-based New Distribution Capability (NDC) standard in the context of travel-related products), they may nonetheless employ different mechanisms to initiate the exchange of data.

SUMMARY

A first aspect of the specification provides a method comprising: maintaining, via an intermediation server, indications of possible steps associated with respective provider systems, the possible steps comprising a subset of one or more given possible steps of a computing-process flow implemented at a client device in conjunction with communicating with provider systems; and providing, from the intermediation server, to one or more of the provider systems, a communication from the client device received in conjunction with implementing a given step of the computing-process flow; receiving, at the intermediation server, from a given provider system, a response to the communication; and providing, from the intermediation server, to the client device: the response; and an indication of one or more respective possible steps associated with the given provider system in the indications, the one or more respective possible steps for implementation at the client device in conjunction with receiving the response and implementing the computing-process flow.

At the first aspect, the computing-process flow may comprise one or more required steps and one or more given possible steps.

At the first aspect, the computing-process flow may comprise an Applications Programming Interface (API) flow.

At the first aspect, the indications of the possible steps may be one or more of defined and stored at a memory available to the server.

At the first aspect, the indications of the possible steps may comprise indicators indicating which of the one or more possible next steps to implement in the computing-process flow at the client device.

At the first aspect, the intermediation server may comprise an aggregator server.

At the first aspect, associated possible steps may differ for respective provider systems.

At the first aspect, associated possible steps for a respective provider system may depend on the given step of the computing-process flow.

At the first aspect, the method may further comprise: receiving, at the intermediation server, from the given provider system, one or more further indications of one or more other possible steps of the computing-process flow associated with the given provider system; and updating the indications of the possible steps with the further indications.

At the first aspect, one or more of the intermediation server, and one or more of the provider systems, operate according to New Distribution Capability (NDC) standard.

A second aspect of the present specification provides a server comprising: a communication interface; and a controller configured to: maintain indications of possible steps associated with respective provider systems, the possible steps comprising a subset of one or more given possible steps of a computing-process flow implemented at a client device in conjunction with communicating with provider systems; provide to one or more of the provider systems, a communication from the client device received in conjunction with implementing a given step of the computing-process flow; receive, from a given provider system, a response to the communication; and provide, via the communication interface, to the client device: the response; and an indication of one or more respective possible steps associated with the given provider system in the indications, the one or more respective possible steps for implementation at the client device in conjunction with receiving the response and implementing the computing-process flow.

At the second aspect, the computing-process flow may comprise one or more required steps and one or more given possible steps.

At the second aspect, the computing-process flow may comprise an Applications Programming Interface (API) flow.

At the second aspect, the indications of the possible steps may be one or more of defined and stored at a memory available to the server.

At the second aspect, the indications of the possible steps may comprise indicators indicating which of the one or more possible next steps to implement in the computing-process flow at the client device.

At the second aspect, the server may further comprise an aggregator server.

At the second aspect, associated possible steps may differ for respective provider systems.

At the second aspect, associated possible steps for a respective provider system depend on the given step of the computing-process flow.

At the second aspect, the controller may be further configured to: receive, from the given provider system, one or more further indications of one or more other possible steps of the computing-process flow associated with the given provider system; and update the indications of the possible steps with the further indications.

At the second aspect, one or more of the server, and one or more of the provider systems, may operate according to New Distribution Capability (NDC) standard.

A second aspect of the present specification provides a method comprising: maintaining, via an intermediation server, indications of predefined data descriptions associated with respective provider systems, the predefined data descriptions comprising a subset of one or more given predefined data descriptions to be provided at a client device during implementation of a computing-process flow in conjunction with communicating with the respective provider systems; providing, from the intermediation server, to one or more of the respective provider systems, a communication from the client device received in conjunction with implementing a given step of the computing-process flow; receiving, at the intermediation server, from a given provider system, a response to the communication; and providing, from the intermediation server, to the client device: the response; and a predefined data description associated with the given provider system in the indications, the predefined data description to be provided at the client device in conjunction with the response to cause the client device to implement the predefined data description, according to the computing-process flow.

At the third aspect, the computing-process flow may comprise an Applications Programming Interface (API) flow.

At the third aspect, the indications of the predefined data descriptions may be one or more of defined and stored at a memory available to the intermediation server.

At the third aspect, the indications of the predefined data descriptions may be mapped to respective predefined data descriptions.

At the third aspect, the predefined data descriptions may comprise descriptions for one or more of: generating respective predefined requests for given information at the client device; and providing one or more data fields to be provided at the client device. The method of the third aspect may further comprise: receiving, at the intermediation server, from the client device, in response to providing the predefined data description, data that has been provided, via the client device, at the one or more data fields; and providing, from the intermediation server, to the given provider system, the data. The method of the third aspect may further comprise: receiving, at the intermediation server, from the client device, in response to providing the predefined data description, data that has been provided, via the client device, at the one or more data fields; converting, at the intermediation server, the data into respective data processable by the given provider system; and providing, from the intermediation server, to the given provider system, the respective data.

At the third aspect, the predefined data description may comprise: one or more of a textual and graphic indication of an automobile-based pickup service; and descriptions for providing one or more data fields at the client device for indicating one or more of a pickup date and a pickup time.

At the third aspect, the method may further comprise: receiving, at the intermediation server, from the given provider system, one or more further indications of one or more new predefined data descriptions of the computing-process flow associated with the given provider system; and one or more of: providing the one or more new predefined data descriptions to the client device; and, updating the indications of the predefined data descriptions with the one or more further indications.

At the third aspect, one or more of the intermediation server, and one or more of the provider systems operate, may according to New Distribution Capability (NDC) standard.

A fourth aspect of the present specification provides a server comprising: a communication interface; and a controller configured to: maintain indications of predefined data descriptions associated with respective provider systems, the predefined data descriptions comprising a subset of one or more given predefined data descriptions to be provided at a client device during implementation of a computing-process flow in conjunction with communicating with the respective provider systems; provide, to one or more of the respective provider systems, a communication from the client device received in conjunction with implementing a given step of the computing-process flow; receive, from a given provider system, a response to the communication; and provide, via the communication interface, to the client device: the response; and a predefined data description associated with the given provider system in the indications, the predefined data description to be provided at the client device in conjunction with the response to cause the client device to implement the predefined data description, according to the computing-process flow.

At the fourth aspect, the computing-process flow may comprise an Applications Programming Interface (API) flow.

At the fourth aspect, the indications of the predefined data descriptions may be one or more of defined and stored at a memory available to the server.

At the fourth aspect, the indications of the predefined data descriptions may be mapped to respective predefined data descriptions.

At the fourth aspect, the predefined data descriptions may comprise descriptions for one or more of: generating respective predefined requests for given information at the client device; and providing one or more data fields to be provided at the client device. The controller may be further configured to: receive, from the client device, in response to providing the predefined data description, data that has been provided, via the client device, at the one or more data fields; and provide, to the given provider system, the data. The controller may be further configured to: receive, from the client device, in response to providing the predefined data description, data that has been provided, via the client device, at the one or more data fields; convert the data into respective data processable by the given provider system; and provide, to the given provider system, the respective data.

At the fourth aspect, the predefined data descriptions may comprise: one or more of a textual and graphic indication of an automobile-based pickup service; and descriptions for providing one or more data fields at the client device for indicating one or more of a pickup date and a pickup time.

At the fourth aspect, the controller may be further configured to: receive, from the given provider system, one or more further indications of one or more new predefined data descriptions of the computing-process flow associated with the given provider system; and one or more of: provide the one or more new predefined data descriptions to the client device; and, update the indications of the predefined data descriptions with the one or more further indications.

At the fourth aspect, one or more of the server, and one or more of the provider systems, operate according to New Distribution Capability (NDC) standard.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 5 depicts examples of indications of possible steps associated with respective provider systems, examples of indications of predefined data descriptions associated with respective provider systems, and examples of the predefined data descriptions.

Figure 4:
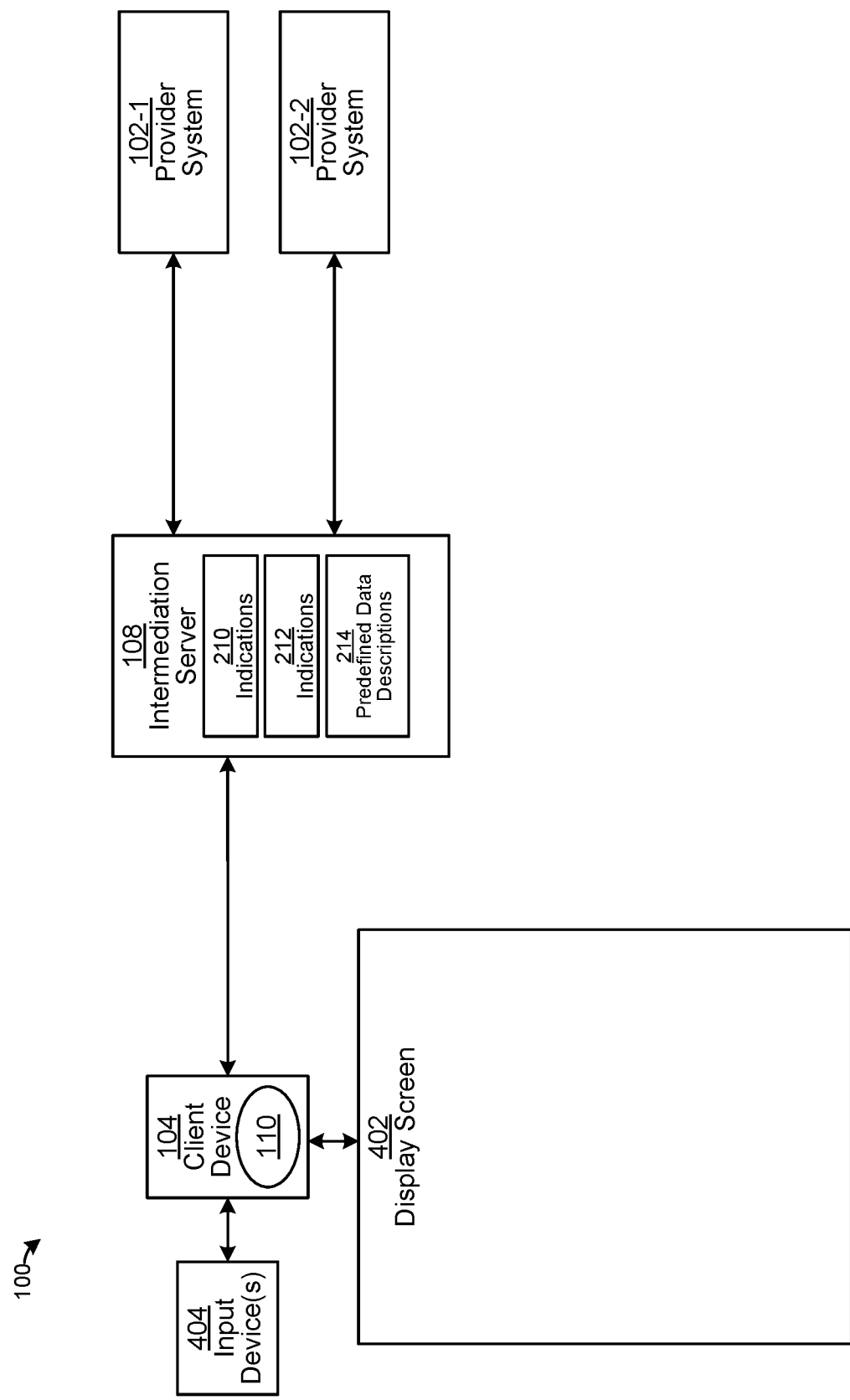
FIG. 4 depicts the system of FIG. 1 in further detail, according to non-limiting examples.
Figure 15:
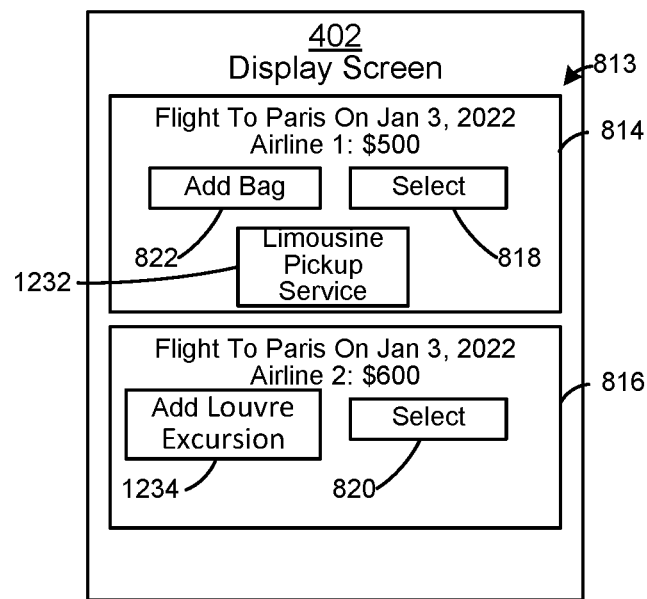

FIG. 15 depicts a Graphic User Interface provided at a display screen associated with a client device when the system of FIG. 4 implements a combined method for controlling operation of a client device via an intermediation server according to indications of possible steps associated with respective provider systems and indications of predefined data descriptions associated with respective provider, according to non-limiting examples.

DETAILED DESCRIPTION

Figure 1:
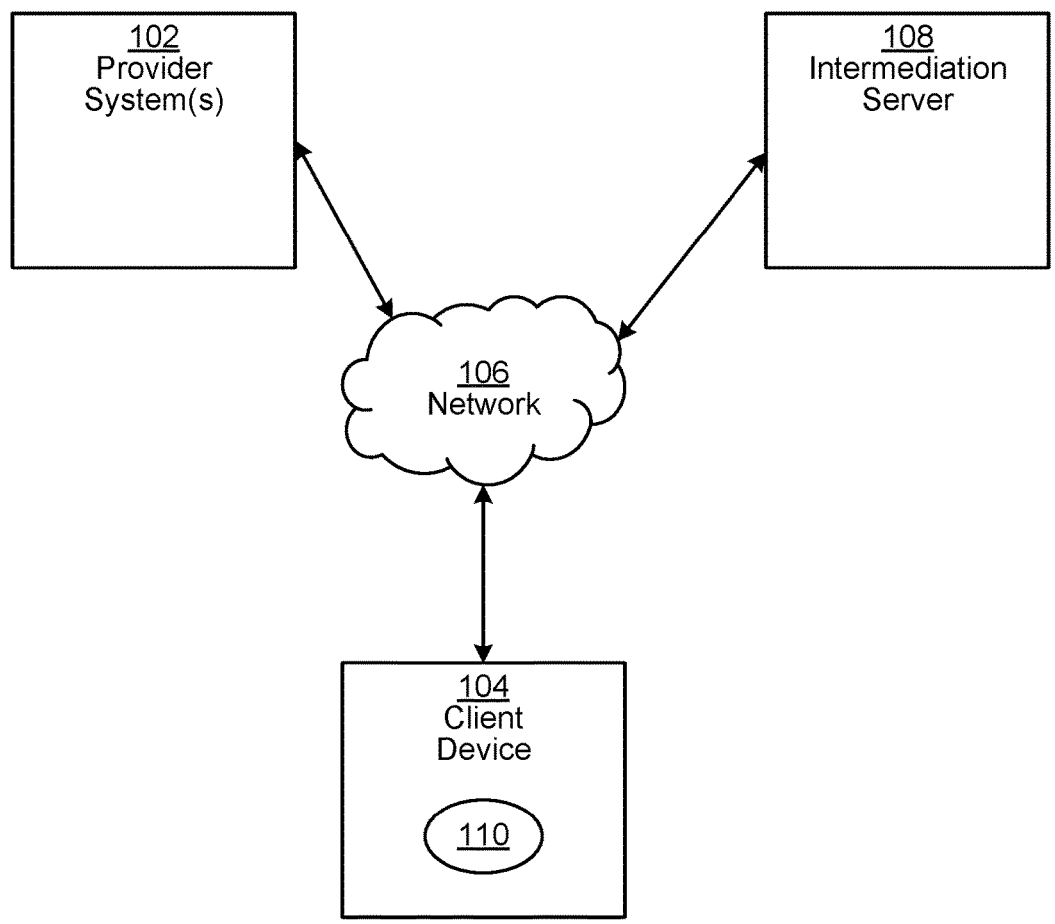
FIG. 1 depicts a system for controlling operation of a client device via an intermediation server, according to non-limiting examples.

FIG. 1 depicts a system 100 for intermediation between a provider system (e.g. one or more servers or other suitable computing devices), and a client device. Provider objects, in the examples discussed herein, may comprise provider objects and/or data records which correspond to products and/or items, such as travel-related goods and services (e.g. flights, hotel reservations, car rentals and the like), provided by a provider system. More specifically, the products and/or items discussed in the examples below may be flight tickets and related services (e.g. limo pickup services, excursions at a destination, baggage check services, in-flight food, entertainment, pet-related services, and the like). However, as will be apparent to those skilled in the art, the systems and methods discussed below can also be applied to various other types of data objects and/or items.

Delivery of the items mentioned above is typically controlled by a provider entity, such as an airline in the case of the items discussed in connection with the examples provided herein. The system 100 includes one or more provider systems 102 (e.g. one or more servers or other suitable computing devices), which in this example is operated by one or more provider entities. The system 100 can include a plurality of client devices 104, although only one client device 104 is shown in FIG. 1 for illustrative purposes.

The system 100 can include a plurality of provider systems 102, each operated by respective provider entities (e.g. various airlines), although only one provider system 102 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 102.

A provider object is understood to define an item, or a combination of items, which may be offered for purchase (e.g. by end users of the items) including, but not limited to one or more of flights, train rides, hotel stays, airport lounge access, seat upgrades, baggage check services, in-flight food, entertainment, pickup services, excursion services, pet-related services, and the like, and/or associated services. Thus, in examples discussed below, a provider object may define a flight operated by the provider entity, and/or services associated with the flight, or proposed as standalone services. Each provider object therefore may contain various fields (e.g. data fields), and the like. Certain fields define item attributes, such as product object identifiers (e.g. service identifiers, item identifiers, product identifiers and the like), locations, dates and times corresponding to the products (e.g. flight times and other itinerary data). The type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Requests for provider objects may be received at the provider system 102 from other components of the system 100. For example, the requests may be received from a client device 104, via a network 106 (e.g. any suitable combination of local and wide area networks, including the Internet) and via an intermediation server 108. As will be described below, the intermediation server 108 generally intermediates between the client device 104 and the provider system 102, for example such that the client device 104 may request products from the provider system 102, and/or more than one provider system 102, via the intermediation server 108.

Furthermore, the intermediation server 108 may convert data between formats associated with provider systems 102 and the client device 104. For example, a first provider system 102 may communicate and/or provide provider objects, and/or offers for provider objects, according to a first format, and a second provider system 102 may communicate and/or provide provider objects, and/or offers for provider objects, according to a second format (e.g. which may be the same or different from the first format). Neither format may be compatible with a format used by the client device 104 to communicate. As such, the intermediation server 108 may convert data received in different formats from the provider system 102, to a format compatible with the client device 104, and vice versa.

The client device 104, in the present example, may be operated by a travel agent entity, and therefore generates and provides requests for provider objects (e.g. representing products which may be for purchase), and/or requests to purchase products (e.g. represented by the provider objects), to the provider system 102, via the intermediation server 108, on behalf of end users (e.g. travelers).

Hence, in one example, the intermediation server 108 may comprises an aggregator server which communicates with a plurality of provider system 102 and aggregates provider objects and/or offers for provider objects from the plurality of provider system 102, to provide to the client device 104.

Alternatively, a client device 104 may be operated by a provider system 102. In yet another alternative, a provider system 102 may operate the intermediation server 108. Hence, it is understood that while the provider system 102, the client device 104 and the intermediation server 108 are all depicted as being separate from each other in FIG. 1, they may be associated with various combinations of one or more entities, and/or functionality of the provider system 102, the client device 104 and the intermediation server 108 may be combined in any suitable manner at one or more computing devices and/or servers and/or cloud computing devices. As such, herein, rather than refer to components of the system 100 communicating via transmitting data therebetween (e.g. such as via the network 106), herein communication between components of the system 100 is referred to as the components providing data, and the like, therebetween which may include, but is not limited to, transmitting data over the network 106, communicating data when the components are local to each other and/or combined, and the like.

Various other mechanisms for initiating the creation of the provider objects are also contemplated. For example, end users (via the client device 104 and/or client devices and/or additional computing devices, not shown in FIG. 1) may initiate the creation of the provider objects via direct interaction with a website hosted by the intermediation server 108. Various mechanisms for the creation of provider objects will be apparent to those skilled in the art, such as the "offer" and "order" mechanisms specified by the NDC standard. The creation of provider objects in response to product purchase requests is not discussed in further detail herein.

The client device 104 is configured to receive data contained in the provider objects via the intermediation server 108. Data obtained by the client device 104, via the intermediation server 108, may be presented to users served by the client device 104, for example via a display screen which may be local to the client device 104, for example see FIG. 4); further information associated with the items represented by the provider objects may be requested by the client device 104 which may include, but is not limited to the client device 104 ordering the items. In other words, the system 100 enables the client device 104 to request further information associated with the items represented by the provider objects, via the intermediation server 108. The client device 104 may be configured to request the further information and/or initiate such orders by providing requests to the provider system 102 via the intermediation server 108.

The provider objects provided by the provider system 102 generally include provider object data representing at least one item provided by the provider system 102. In some examples, the provider object data may include a provider object identifier and/or provider object identifier data, that identifies the provider object to the provider system 102. The provider object data generally comprises information that identifies a travel related product and/or service. Whether the provider object data includes a specific provider object identifier, or not may depend on whether a provider object is being in an NDC or GDS format. For example, when a provider object comprises an NDC offer, the provider object identifier data may comprise an identifier generated by the provider system 102 which specifically identifies the NDC offer. However, when a provider object comprises an Edifact recommendation, which generally does not include a specific identifier, the Edifact recommendation may be identified by the provider system 102 based on provider object identifier data such as characteristics of the Edifact recommendation such as a specific order and/or format of data of the Edifact recommendation.

In general, communication between the client device 104 and the intermediation server 108 occurs via a computing-process flow 110 implemented by the client device 104, such as an Applications Programming Interface (API), and the like. For example, during ordering of a provider object (e.g. booking a flight), the client device 104 may implement the computing-process flow 110 in the form of an API, and communications between the client device 104 and the intermediation server 108 may be defined by the API. In particular, when the intermediation server 108 receives a communication from the client device 104, in conjunction with the client device 104 implementing the API, the intermediation server 108 is generally configured to understand and/or determine which step of the computing-process flow 110 is being implemented at the client device 104 to generate the communication. Hence, the intermediation server 108 may also be operating a respective computing-process flow that is complementary to the computing-process flow 110.

However, steps implemented at such a computing-process flow 110 may be different for different provider systems 102. Continuing with examples related to the travel industry, a first provider system 102 may allow adding a checked bag to an offer for a flight before booking and paying for the offer, but not after, while a second provider system 102 may allow adding a checked bag to an offer for a flight only after booking and paying for the offer, but not before. Similarly, a first provider system 102 may offer an automobile-based pickup service, while a second provider system 102 may not offer such an automobile-based pickup service, but may offer excursions at a destination; such services, however, may be specific to given flights. In such examples, different computing-process flows may be implemented at the client device 104 and the intermediation server 108 that are specific to different provider system 102, but such different computing-process flows generally require large amounts of storage space at the client device 104 and the intermediation server 108 and/or may increase processing resource usage the client device 104 and the intermediation server 108 to determine which computing-process flow to use with which provider system 102.

As such, as will be described herein, the computing-process flow 110 may generally comprise one or more required steps and one or more given possible steps. Different subsets of the one or more possible steps may be associated with different provider systems 102. As such, the intermediation server 108 may generally maintain indications of possible steps associated with respective provider systems 102. When the intermediation server 108 receives, from a given provider system 102, a response to a communication from the client device 104, received in conjunction with implementing a given step of the computing-process flow 110, the intermediation server 108 provides, to the client device 104: the response; and an indication of respective possible steps associated with the given provider system 102 in the indications, the respective possible steps for implementation at the client device 104 in conjunction with receiving the response and implementing the computing-process flow 110. Put another way, the intermediation server 108 generally controls operation of the computing-process flow 110 at the client device 104 by providing data that informs the client device 104 which possible steps of the computing-process flow 110 to implement (e.g. and which may inherently also inform the client device 104 which other possible steps of the computing-process flow 110 to ignore).

Alternatively, when provider systems 102 offer provider objects that are specific to the provider systems 102, such as a pickup service, the intermediation server 108 may generally maintain indications of predefined data descriptions associated with respective provider systems 102. For example, such predefined data descriptions may comprise textual and/or graphic descriptions and/or indicators of a particular service, and may cause the client device 104 to provide one or more data fields which may be filled in via the client device 104, for example to indicate a date and time, and the like, for a pickup. When the intermediation server 108 receives, from a given provider system 102, a response to a communication from the client device 104, received in conjunction with implementing a given step of the computing-process flow 110, the intermediation server 108 provides, to the client device 104: the response; and a predefined data description associated with the given provider system 102 in the indications, the predefined data description to be provided at the client device 104, in conjunction with the response, to cause the client device 104 to implement the predefined data description, according to the computing-process flow 110. Put another way, the intermediation server 108 generally controls operation of the computing-process flow 110 at the client device 104 by providing the predefined data description, which may be provided at a display screen associated with the client device 104, and which enables the client device 104 to populate data fields of the predefined data description, which are returned to the intermediation server 108 to order an associated service.

It is further understood that, in some examples, the intermediation server 108 and/or one or more of the provider systems 102 operate according to New Distribution Capability (NDC) standard.

Figure 2:
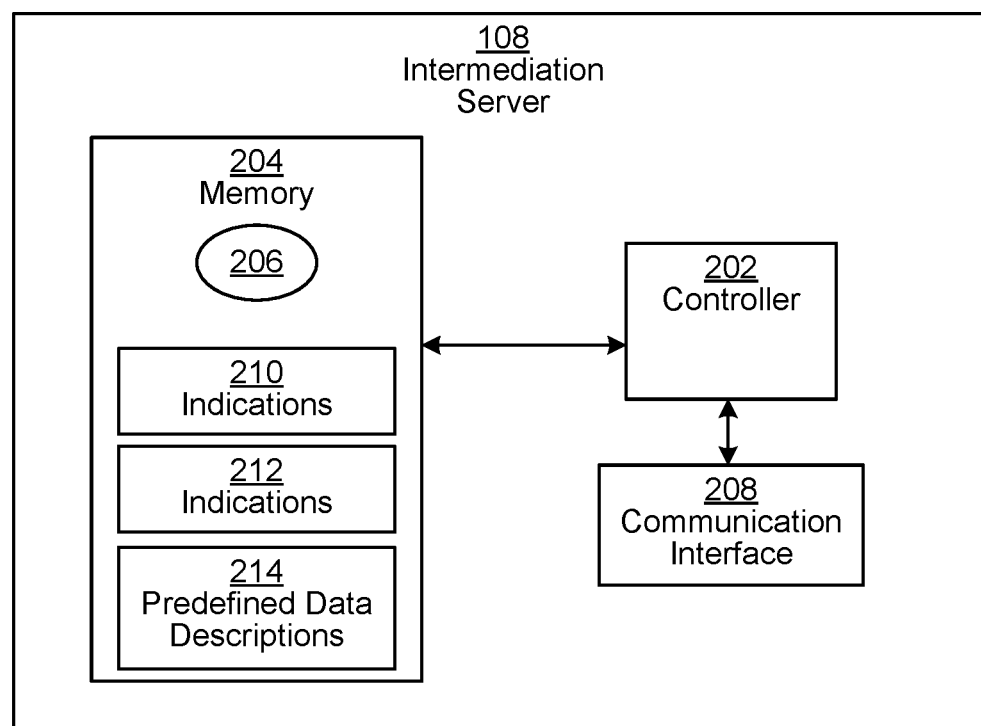
FIG. 2 depicts an intermediation server for controlling operation of a client device, according to non-limiting examples.

Turning to FIG. 2, before discussing the functionality of the system 100 in greater detail, certain components of the intermediation server 108 will be discussed in greater detail. While depicted as one device, the intermediation server 108 may comprise one or more computing devices and/or one or more cloud computing devices that may be geographically distributed.

As shown in FIG. 2, the intermediation server 108 includes at least one controller 202, such as a central processing unit (CPU) or the like. The controller 202 is interconnected with a memory 204 storing an application 206, the memory 204 implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the intermediation server 108 to communicate with the other computing devices of the system 100 (i.e. the provider systems 102 and the client device 104) via the network 106, though it is understood such communication may occur locally when components of the system 100 are combined. The communication interface 208 therefore may include any necessary components (e.g. network interface controllers (NICs), radio units, and the like) to communicate via the network 106. The specific components of the communication interface 208 may be selected based on upon the nature of the network 106 and/or local communication between components of the system 100, and the like. The intermediation server 108 can also include input and output devices connected to the controller 202, such as keyboards, mice, displays, and the like (not shown).

The components of the intermediation server 108 mentioned above can be deployed in a single enclosure, or in a distributed format. In some examples, therefore, the intermediation server 108 includes a plurality of processors, either sharing the memory 204 and communication interface 208, or each having distinct associated memories and communication interfaces. As such, it is understood that the memory 204, and/or a portion of the memory 204, may be internal (e.g. as depicted) or external to the intermediation server 108; regardless, the controller 202 is understood to have access to the memory 204.

As depicted, the memory 204 may store indications 210 of possible steps associated with respective provider systems 102, the possible steps comprising a subset of one or more given possible steps of the computing-process flow 110 implemented at the client device 104 in conjunction with communicating with the provider systems 102.

As depicted, the memory 204 may store indications 212 of predefined data descriptions associated with respective provider systems 102, the predefined data descriptions comprising a subset of one or more given predefined data descriptions to be provided at the client device 104 during implementation of the computing-process flow 110 in conjunction with communicating with the respective provider systems 102.

As depicted, the memory 204 may store predefined data descriptions 214 associated with respective provider systems 102.

Examples of the indications 210, 212 and the predefined data descriptions 214 will be described in further detail below with respect to FIG. 5.

The memory 204 also stores a plurality of computer-readable programming instructions, executable by the controller 202, in the form of various applications, including the application 206. As will be understood by those skilled in the art, the controller 202 executes the instructions of the application 206 (and any other suitable applications) in order to perform various actions defined by the instructions contained therein. In the description below, the controller 202, and more generally the intermediation server 108, are said to be configured to perform those actions. It will be understood that they are so configured via the execution (by the controller 202) of the instructions of the applications stored in memory 204.

In some examples, execution of the application 206, as will be discussed below, configures the intermediation server 108 to implement functionality for controlling operation of the client device 104 according to the indications 210 of possible steps associated with respective provider systems 102, including but not limited to, the blocks of a method set forth in FIG. 6.

In other examples, execution of the application 206, as will be discussed below, configures the intermediation server 108 to implement functionality for controlling operation of the client device 104 according to the indications 212 of predefined data descriptions associated with respective provider systems 102, including but not limited to, the blocks of a method set forth in FIG. 7.

While structure of the provider system 102 and the client device 104 is not described in detail, the provider system 102 and the client device 104 are understood to have a similar structure as the intermediation server 108, but adapted for the functionality of the provider system 102 and the client device 104. In a particular example, the client device 104 is understood to comprise, and/or have access to, a display screen (e.g. see FIG. 4); similarly, a controller of the client device 104 is understood to implement the computing-process flow 110 according to the indications 210, 212, for example as received from the intermediation server 108.

Figure 3:
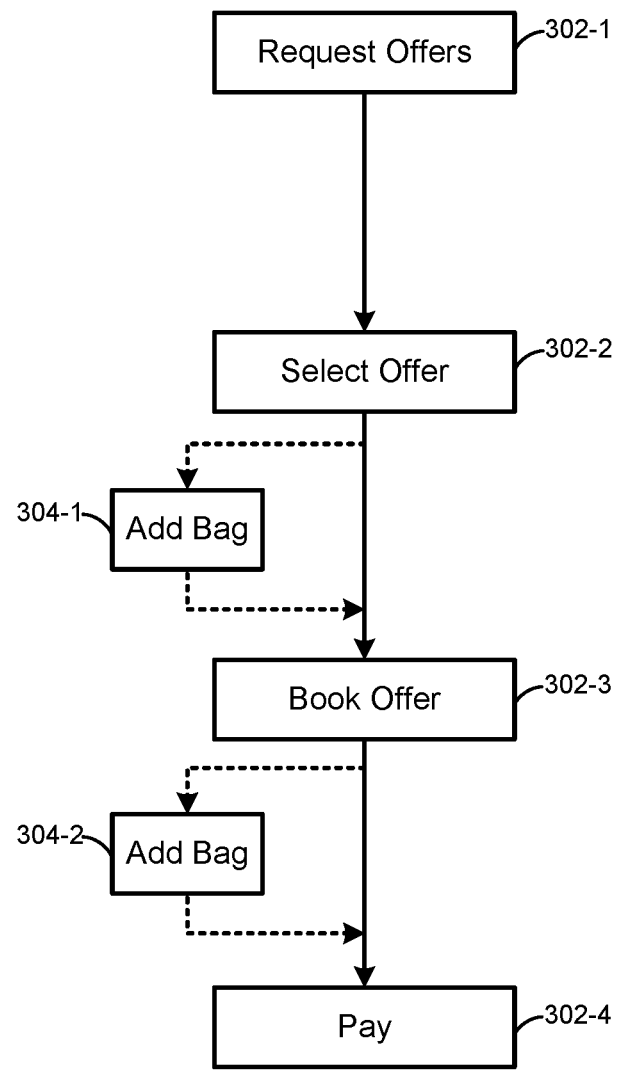
FIG. 3 depicts a computing-process flow implemented at a client device of the system of FIG. 1, according to non-limiting examples.

Attention is next directed to FIG. 3 which depicts a block diagram of an example of the computing-process flow 110. While the example computing-process flow 110 is depicted in the form of a flow chart, it is understood that the example computing-process flow 110 (e.g. hereafter the computing-process flow 110) may shows steps of an API that include required steps 302-1, 302-2, 302-3, 302-4 and possible steps 304-1, 304-2. The required steps 302-1, 302-2, 302-3, 302-4 are hereafter interchangeably referred to, collectively, as the required steps 302 and, generically, as a required step 302. This convention will be used throughout the present specification. For example, the possible steps 304-1, 304-2 may be referred to as the possible steps 304 or a possible step 304.

Furthermore, the term "required steps" as used herein, may be understood to include steps of the computing-process flow 110 that are always implemented at the client device 104 when the client device 104 implements the computing-process flow 110. Continuing with a travel industry example, as depicted, the computing-process flow 110 represents required steps 302 for: requesting (e.g. the required step 302-1) offers for flights (e.g. provider objects); selecting (e.g. the required step 302-2) an offer of a flight (e.g. a provider object) to be booked; booking (e.g. the required step 302-3) a selected offer of a flight (e.g. a provider object); and paying (e.g. the required step 302-4) for the selected offer of a flight (e.g. a provider object) that is being booked. Hence, in particular, each of the required steps 302 must be implemented to book an offer of a flight (e.g. book a seat on a flight), and in the depicted order.

In contrast, the term "possible steps" as used herein, may be understood to include steps of the computing-process flow 110 that may or may not be implemented at the client device 104, with selection of which possible steps 304 to implement being controlled by the intermediation server 108. In particular, selection of which possible steps 304 that may be implemented is understood not to be controlled by the client device 104. Continuing with a travel industry example, as depicted, the computing-process flow 110 represents possible steps 304 for: adding (e.g. the possible step 304-1) a checked bag to the flight selected at the required step 302-2 before the flight is booked at the required step 302-3; and adding (e.g. the possible step 304-2) a checked bag to the flight selected at the required step 302-2 after the flight is booked at the required step 302-3 and before the flight is paid for at the required step 302-4.

To distinguish between the required steps 302 and the possible steps 304, lines between the required steps 302 are depicted as solid, and lines to the possible steps 304 are depicted as dashed.

Furthermore, it is understood that not all steps 302, 304 may be depicted. For example, other required steps 302 may include, but are not limited to: providing a list of inflight services for a given offer of a flight; providing a list of seat availability for a flight, and the like, among other possibilities.

Furthermore, other possible steps 304 may include, but are not limited to: selecting a particular seat on the flight; paying in full when booking; partially paying when booking; deferring payment when booking, and the like. Indeed, it is understood that for any given suitable required step 302 being implemented, one or more possible steps 304 may be implemented. For example possible steps 304 for adding a bag and for selecting a particular seat on a flight may be implemented when selecting an offer at the required step 302-2, and/or when booking an offer at the required step 302-3.

Furthermore, it is understood that a step 302, 304 may be further associated with a respective graphic user interface (GUI) that may be rendered at a display screen associated with the client device 104.

For example, at the required step 302-1, a user of the client device 104 may enter criteria at data fields of a GUI used for searching for offers of flights, such as a date for a flight, a departure airport, an arrival airport, among other possibilities flight to book; the criteria may be provided to the intermediation server 108, and to the provider systems 102, which may return respective offers of flights that meet the criteria.

Similarly, at the required step 302-2, a list of offers of the flights returned by the provider systems 102 may be provided in a GUI at a display screen, and from which a user of the client device 104 may select a flight to book, and from which a user of the client device 104 may select electronic buttons, and the like to add a service to an offer, such as a pickup service.

Similarly, at the required step 302-3, information for a selected flight may be provided in a GUI at a display screen, and from which a user of the client device 104 may select electronic buttons to pay for the flight, and/or to add a service to a booking, such as a pickup service, and the like.

Similarly, at the required step 302-4, fields for entering payment information, such as credit card information, to pay for a selected flight being booked may be provided in a GUI at a display screen.

Similarly, at the possible steps 304, a GUI may be provided at a display screen, the GUI including fields for adding bags to a booking (e.g. before or after a booking is made at the required step 302-3, but after a particular flight is selected at the required step 302-2) and which may include fields for entering a number of bags to be added to a booking, and the like.

While not depicted, it is further understood that any suitable required step 302 may be implemented in conjunction with providing predefined data descriptions, for example to book a service, and the like, associated with a given flight (e.g. and/or provider object). Such examples will be described in more detail below with respect to FIG. 12, FIG. 13 and FIG. 14.

Attention is now directed to FIG. 4 which aspects of one example of the system 100 that includes two provider systems 102-1, 102-2 (e.g. a first provider system 102-1, and a second provider system 102-2). For example, as depicted, the intermediation server 108 is in communication with the client device 104, and the two provider systems 102-1, 102-2, that may include, but are not limited to respective servers (or respective combinations of servers and/or respective cloud computing devices) operated by different airlines. Furthermore, as depicted, the client device 104 is in communication with a display screen 402 and one or more input devices 404, such as any suitable combination of a keyboard, a pointing device (e.g. a mouse), a voice recognition device, and the like.

While the network 106 is not depicted, it is nonetheless understood to be present. For example, communication links between components of the system 100 are depicted in FIG. 4, and throughout the present specification, as double-ended arrows between respective components; the communication links may include any suitable combination of wireless and/or wired links and/or wireless and/or wired communication networks including, but not limited to, the network 106.

Attention is next directed to FIG. 5 which depict examples of the indications 210, 212, and two examples of predefined data descriptions 214-1, 214-2, which may be stored at the memory 204 associated with the intermediation server 108.

While the indications 210, 212 are stored in a tabular format, the indications 210, 212 may be stored in any suitable manner, for example in any suitable database format.

Furthermore, while the indications 210, 212 are depicted as separate from one another, the indications 210, 212 may combined, for example as a single table, and the like. For example, as depicted, each of the indications 210, 212 include identifiers of the respective provider systems 102-1, 102-2 (e.g. respective text "102-1", "102-2") in rows of a first column. For the indications 210, respective identifiers of possible steps 304-1, 304-2 (e.g. respective textual identifiers "304-1", "304-2"), associated with a respective provider system 102 in a respective row, are provided in a third column, and associated current steps 302-2, 302-3 are provided in a second column (e.g. respective textual identifiers "302-2", "302-3").

While not depicted, the indications 210 may further comprise identifiers of certain types of offers, and the like, for which the possible steps 304 may be implemented, or not implemented. For example, with respect to the example of possible steps 304 for adding bags of FIG. 3, a given provider system 102 only allow adding bags for certain flights to certain arrival airports (and/or destinations) and/or may allow adding bags for flights to most cities, other than one or more given arrival airports (and/or given destinations). In these examples, the indications 210 may further comprise identifiers of offers, and the like, associated with the respective provider systems 102, for which associated possible steps 304 may, or may not, be implemented. For example, for the provider system 102-1, the indications 210 may indicate that, for the current step 302-2, the possible step 304-1 is to be implemented except for offers of flights to Tampa Airport, and the like.

Similarly, for the indications 212, respective identifiers of predefined data descriptions 214-1, 214-2 (e.g. respective textual identifiers "214-1", "214-2"), associated with a respective provider system 102 in a respective row, are provided in a second column. Hence, for example, the indications 210, 212 could be combined into a single table by including the first column of either of the indications 210, 212 in one table with the respective second columns of the indications 210, 212.

It is furthermore understood that the indications 210 of the possible steps 304, as depicted in FIG. 5, are one or more of defined and stored at the memory 204 available to the intermediation server 108.

It is furthermore understood that the indications 210 of the possible steps 304 comprise indicators indicating which of the one or more possible next steps 304 to implement in the computing-process flow 110 at the client device 104.

For example, as depicted, at the indications 210, the first provider system 102-1 is associated with the first possible step 304-1 (e.g. as indicated by the identifier "304-1"), such that, when the client device 104 is implementing the second required step 302-2 (e.g. as indicated by the identifier "302-2") to select an offer of a flight associated with the first provider system 102-1, the first possible step 304-1 may be implemented at the client device 104 to add a bag to a booking for offer of the flight (though the booking may not be completed until the next required steps 302-3, 302-4 are implemented). As previously mentioned, the indications 210 may further indicate that the first possible step 304-1 may be implemented only when offers of flights are to certain given arrival airports and/or destinations of the first provider system 102-1, and/or the indications 210 may further indicate that the first possible step 304-1 may not be implemented when offers of flights are to certain given arrival airports and/or destinations of the first provider system 102-1.

In contrast, at the indications 210, the second provider system 102-2 is associated with the second possible step 304-2 (e.g. as indicated by the identifier "304-2"), such that, when the client device 104 is implementing the third required step 302-3 (e.g. as indicated by the identifier "302-4") to book an offer of a flight associated with the second provider system 102-2, the second possible step 304-2 may be implemented at the client device 104 to add a bag while booking the offer of a flight (e.g. before paying for the booking at the fourth required step 302-4). As previously mentioned, the indications 210 may further indicate that the second possible step 304-2 may be implemented only when offers of flights are to certain given arrival airports and/or destinations of the second provider system 102-2, and/or the indications 210 may further indicate that the second possible step 304-2 may not be implemented when offers of flights are to certain given arrival airports and/or destinations of the second provider system 102-2.

Hence it is understood that associated possible steps 304 differ for respective provider systems 102.

It is furthermore understood that associated possible steps 304 differ for respective provider systems 102 generally depend on a given step (e.g. a required step 302) of the computing-process flow 110 which is being implemented.

For example, as has been previously described, the intermediation server 108 is generally configured to determine which step of the computing-process flow 110 is being implemented at the client device 104; as such, the intermediation server 108 may determine which step of the computing-process flow 110 is being implemented at the client device 104 and provide an associated indication 212 of a possible step 304 accordingly, for example to cause the client device 104 to implement the indicated possible step 304.

It is furthermore understood that a given provider system 102 may provide, to the intermediation server 108 one or more further indications of one or more other further possible steps of the computing-process flow 110 associated with the given provider system 102. For example, the first provider system 102-1 may start allowing adding bags not only when selecting an offer of a flight in association with the second required step 302-2, but also when booking an offer in association with the second required step 302-3; as such, the given provider system 102 may provide, to the intermediation server 108, an indication to associate the second possible step 304-2 with the given provider system 102 In these examples, the intermediation server 108 may update the indications 210 of the possible steps 304 with the further indications. In particular, in this example, the indications 210 may be updated to include the indicator "304-2" in association with the provider system 102-1 (e.g. the indicator "304-2" may be added to the first row of the indications 210 in the tabular format).

Hence, it is understood that the indications 212 of the predefined data descriptions 214, as depicted in FIG. 5, are one or more of defined and stored at the memory 204 available to the intermediation server 108.

As depicted, at the indication 212, the first provider system 102-1 is associated with the first predefined data description 214-1 (e.g. as indicated by the identifier "214-1"), such that, when the first provider system 102-1 provides offers of flights (and/or offers of some flights), an offer of an automobile-based pickup service (e.g. such as a limousine) may also be offered. Indeed, as will be explained, when providing an offer of a flight, for example that may be selected at the second required step 302-2 at the client device 104, the first provider system 102-1 may provide an identifier (e.g. the identifier "214-1") of the first predefined data description 214-1 to the intermediation server 108, which may retrieve the first predefined data description 214-1 from the memory 204 and provide the first predefined data description 214-1 to the client device 104 with the offer. Hence, the first provider system 102-1 may offer the automobile-based pickup service for some flights (e.g. for some departure airports), but not others.

In particular, as depicted, the first predefined data description 214-1 comprises: one or more of a textual and graphic indication of an automobile-based pickup service, for example in the form data (e.g. "(HeaderInfo, String, False, "Limousine Pickup Service")) indicating header information (e.g. indicated by "HeaderInfo") describing text (e.g. "Limousine Pickup Service") that may be provided in a header of a GUI at the client device 104 when the client device 104 processes the first predefined data description 214-1. While as depicted the indication of the automobile-based pickup service in the header information is textual, the indication of the automobile-based pickup service may alternatively be (or may additionally be) graphical, for example in the form of an icon of an automobile, and the like.

As depicted, the first predefined data description 214-1 further comprises: descriptions for providing one or more data fields at the client device 104 for indicating one or more of a pickup date and a pickup time, for example in form of lines of data (e.g. (Location, String, True, "Pickup address") (Time, TimeHHMM, True, "Pickup time") (AddlInfo, String, False, "Additional info")) for causing the client device 104 to provide data fields, and textual descriptions thereof, for indicating a pickup date and a pickup time, as well as optional additional info. Whether or not a data field is optional to be filled in may be indicated by "True" (not-optional and/or mandatory to be filled in) or "False" (optional), as described in more detail below. Furthermore, with regards to the term "TimeHHMM", such a term may define a required format of a received time at a data field, and times not received in this format may be rejected; for example the term "TimeHHMM" may define that a time must be received at a data field in an order of two numbers for the hour (e.g. HH) and two numbers for the minutes (e.g. MM), with no delimiters there between, and hence a time such as 5 am must be received in a field as "0500" and not "5:00" or "5 am", and the like.

Similarly, as depicted, at the indication 212, the second provider system 102-2 is associated with the second predefined data description 214-2, such that, when the second provider system 102-2 provides offers of flights (and/or offers of some flights), an offer of a museum excursion service may also be offered. Indeed, as will be explained, when providing an offer of a flight, for example that may be selected at the second required step 302-3 at the client device 104, the second provider system 102-2 may provide an identifier of the second predefined data description 214-2 to the intermediation server 108, which may retrieve the second predefined data description 214-2 from the memory 204 and provide the second predefined data description 214-2 to the client device 104 with the offer. Hence, the second provider system 102-2 may offer the museum excursion service for some flights (e.g. for some arrival airports), but not others. For example, as depicted, the second predefined data description 214-2 is specific for an excursion to the Louvre Museum in Paris, France, and hence the second predefined data description 214-2 may be provided only for offers of flights to Paris, France.

In particular, as depicted, the second predefined data description 214-2 comprises: one or more of a textual and graphic indication of an excursion service that may be offered with flights to Paris, France, for example in the form data (e.g. "(HeaderInfo, String, False, "Louvre Excursion")) indicating header information (e.g. indicated by "HeaderInfo") describing text (e.g. "Louvre Excursion") that may be provided in a header of a GUI at the client device 104 when the client device 104 processes the second predefined data description 214-2. While as depicted the indication of the excursion service in the header information is textual, the indication of the excursion service may alternatively be (or may additionally be) graphical, for example in the form of an icon of a museum, and the like.

As depicted, the second predefined data description 214-2 further comprises: descriptions for providing one or more data fields at the client device 104 for indicating one or more of a date and an audioguide language, for example in form of lines of data (e.g. (EventDate, DateDDMMYYYY, True, "Date") (GuideLanguage, String, True, "Audioguide Language")) for causing the client device 104 to provide data fields, and textual descriptions thereof, for indicating a date and an audioguide language. While no lines of data for providing data fields for optional information are provided, in other examples, such lines of data for data fields for optional information may be present. Whether or not a data field is optional to be filled in may be indicated by "True" (not optional) or "False" (optional), as described in more detail below. Furthermore, with regards to the term "DateDDMMYYYY", such a term may define a required format of a received date at a data field, and dates not received in this format may be rejected; for example the term "DateDDMMYYYY" may define that a date must be received at a data field in an order of two numbers for the day (e.g. DD), two numbers for the month (e.g. MM), and four numbers for the year (e.g. YYYY), with no delimiters there between, and hence a date such as Jan. 7, 2022 must be received in a data field as "01072022" and not "Jan. 7, 2022" or "Jan. 7, 2022", and the like.

Hence, the predefined data descriptions 214 may comprise data that may be processed by the client device 104 to generate a GUI, for example, in the form of a pop-up box, and the like, which may comprise data fields. Put another way, the predefined data descriptions 214 may comprises descriptions for providing one or more data fields to be provided at the client device 104 and/or the predefined data descriptions 214 may comprise descriptions for generating respective predefined requests for given information at the client device 104, such as a pickup date and/or time, and the like (e.g. a date for an excursion and an audioguide language, and the like).

While examples of predefined data descriptions 214 are provided that pertain to providing a date and time, and/or the like for a service, any other predefined data descriptions 214 are within the scope of the present specification. For example, a predefined data description 214 may be provided for ordering clothing, with associated data fields defining a size of the clothing, and the like, among other possibilities.

It is furthermore understood that the indications 212 of the predefined data descriptions 214 are mapped to respective predefined data descriptions 214. Hence, for example, at the indications 212, the identifier "214-1" is understood to be mapped to, and/or associated with, the of the first predefined data description 214-1 and, similarly, the indication "214-2" is understood to be mapped to, and/or associated with, the of the predefined data 214-2. Hence, such a mapping may occur via identifiers; for example, the first predefined data description 214-1 may be associated with an identifier "214-1" of the indications 212 and the second predefined data description 214-2 may be associated with an identifier "214-2" of the indications 212.

Indeed, it is further understood that the predefined data descriptions 214 may have been received at the intermediation server 108 by a respective provider system 102. For example, the first provider system 102-1 may have provided the first predefined data description 214-1 to the intermediation server 108, which stored the first predefined data description 214-1 at the memory 204 and updated the indications 212 accordingly. Similarly, the second provider system 102-2 may have provided the second predefined data description 214-2 to the intermediation server 108, which stored the second predefined data description 214-2 at the memory 204 and updated the indications 212 accordingly. It is further understood that when a provider system 102 adds a new service, such a provider system 102 may provide an associated predefined data description 214 to the intermediation server 108, which stores the associated predefined data description 214-2 at the memory 204 and updates the indications 212 accordingly. Further, a provider system 102 is further understood to store identifiers of the predefined data descriptions 214 that are also stored at the intermediation server 108.

It is further understood that when a provider system 102 changes an existing service (e.g. a limousine service may be changed to a taxi service), such a provider system 102 may provide an updated predefined data description 214 to the intermediation server 108, which replaces a previous predefined data description 214 with the updated predefined data description 214-2 at the memory 204; in this example, the indications 212 need not be updated as the updated predefined data description 214 may have a same associated identifier, and the like as the previous predefined data description 214 being replaced, hence a mapping between the indications 212 may not change.

Figure 6:
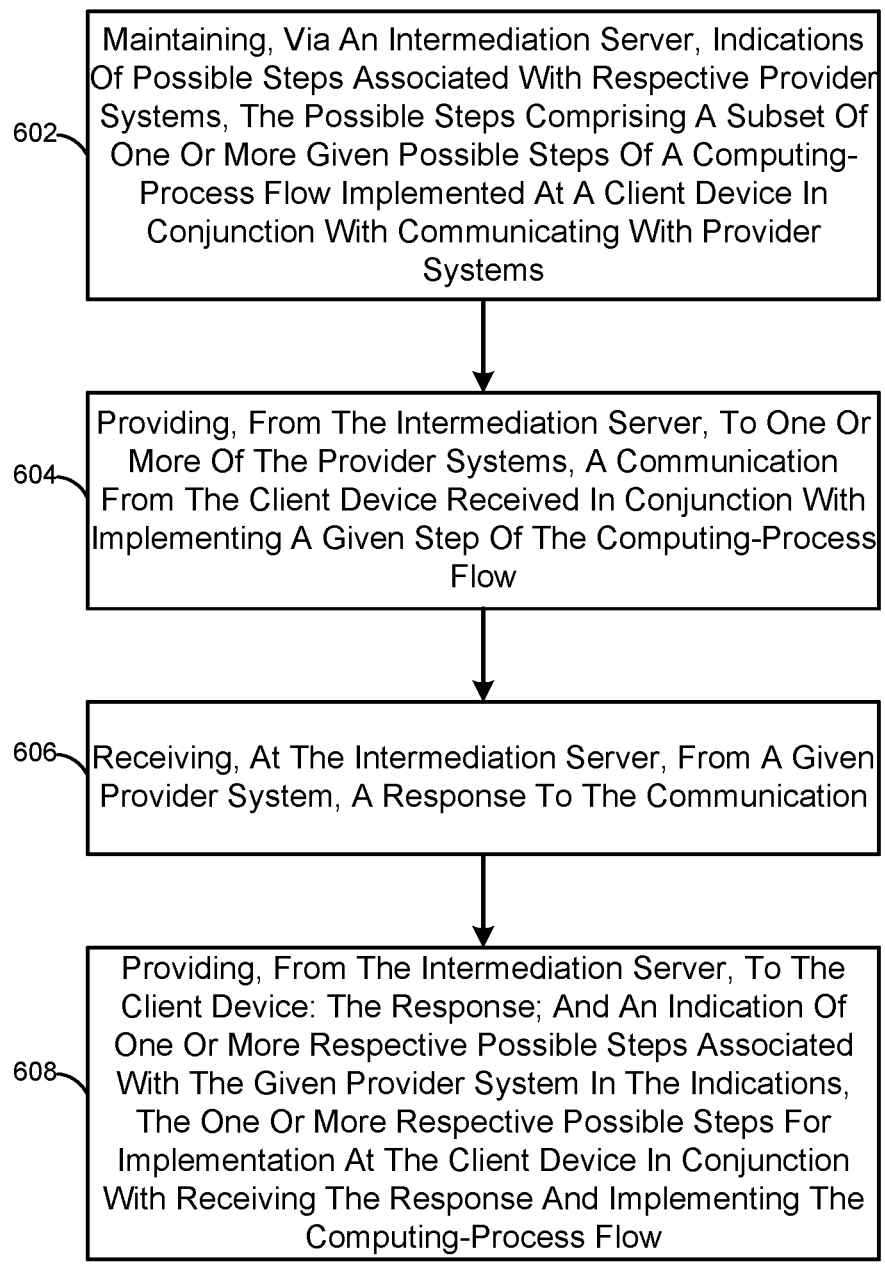
FIG. 6 depicts a method for controlling operation of a client device via an intermediation server according to indications of possible steps associated with respective provider systems, according to non-limiting examples.

Attention is now directed to FIG. 6 which depicts a flowchart representative of a method 600 a method for controlling operation of a client device via an intermediation server according to indications of possible steps associated with respective provider systems. The operations of the method 600 of FIG. 6 correspond to machine readable instructions that are executed by the intermediation server 108, and specifically the controller 202 of the intermediation server 108. In the illustrated example, the instructions represented by the blocks of FIG. 6 are stored at the memory 204 for example, as the application 206. The method 600 of FIG. 6 is one way in which the controller 202 and/or the intermediation server 108 and/or the system 100 may be configured. Furthermore, the following discussion of the method 600 of FIG. 6 will lead to a further understanding of the system 100, and its various components.

The method 600 of FIG. 6 need not be performed in the exact sequence as shown and likewise various blocks may be performed in parallel rather than in sequence. Accordingly, the elements of method 600 are referred to herein as "blocks" rather than "steps." The method 600 of FIG. 6 may be implemented on variations of the system 100 of FIG. 1 and FIG. 4, as well.

At a block 602, the controller 202 and/or the intermediation server 108 maintains indications 210 of possible steps 304 associated with respective provider systems 102, the possible steps 304 comprising a subset of one or more given possible steps 304 of the computing-process flow 110 implemented at the client device 104 in conjunction with communicating with the provider systems 102. However, a subset of the possible steps 304 may include all of the possible steps 304 or fewer than all of the possible steps 304.

At a block 604, the controller 202 and/or the intermediation server 108 provides, to one or more of the provider systems 102, a communication from the client device 104 received in conjunction with implementing a given step (e.g. a required step 302) of the computing-process flow 110.

At a block 606, the controller 202 and/or the intermediation server 108 receives, from a given provider system 102, a response to the communication.

At a block 608, the controller 202 and/or the intermediation server 108 provides, to the client device 104: the response; and an indication of one or more respective possible steps 304 associated with the given provider system 102 in the indications 210, the one or more respective possible steps 304 for implementation at the client device 104 in conjunction with receiving the response and implementing the computing-process flow 110.

In some examples, the method 600 may further comprise the controller 202 and/or the intermediation server 108 receiving, from a given provider system 102, one or more further indications of one or more other possible steps 304 of the computing-process flow 110 associated with the given provider system 102; and updating the indications 210 of possible steps 304 with the further indications. For example, such an additional aspect of the method 600 may enable the intermediation server 108 to update, or generate, the indications 210 as has been previously been described.

The method 600 will be described in more detail below with respect to FIG. 8, FIG. 9, FIG. 10 and FIG. 11.

Figure 7:
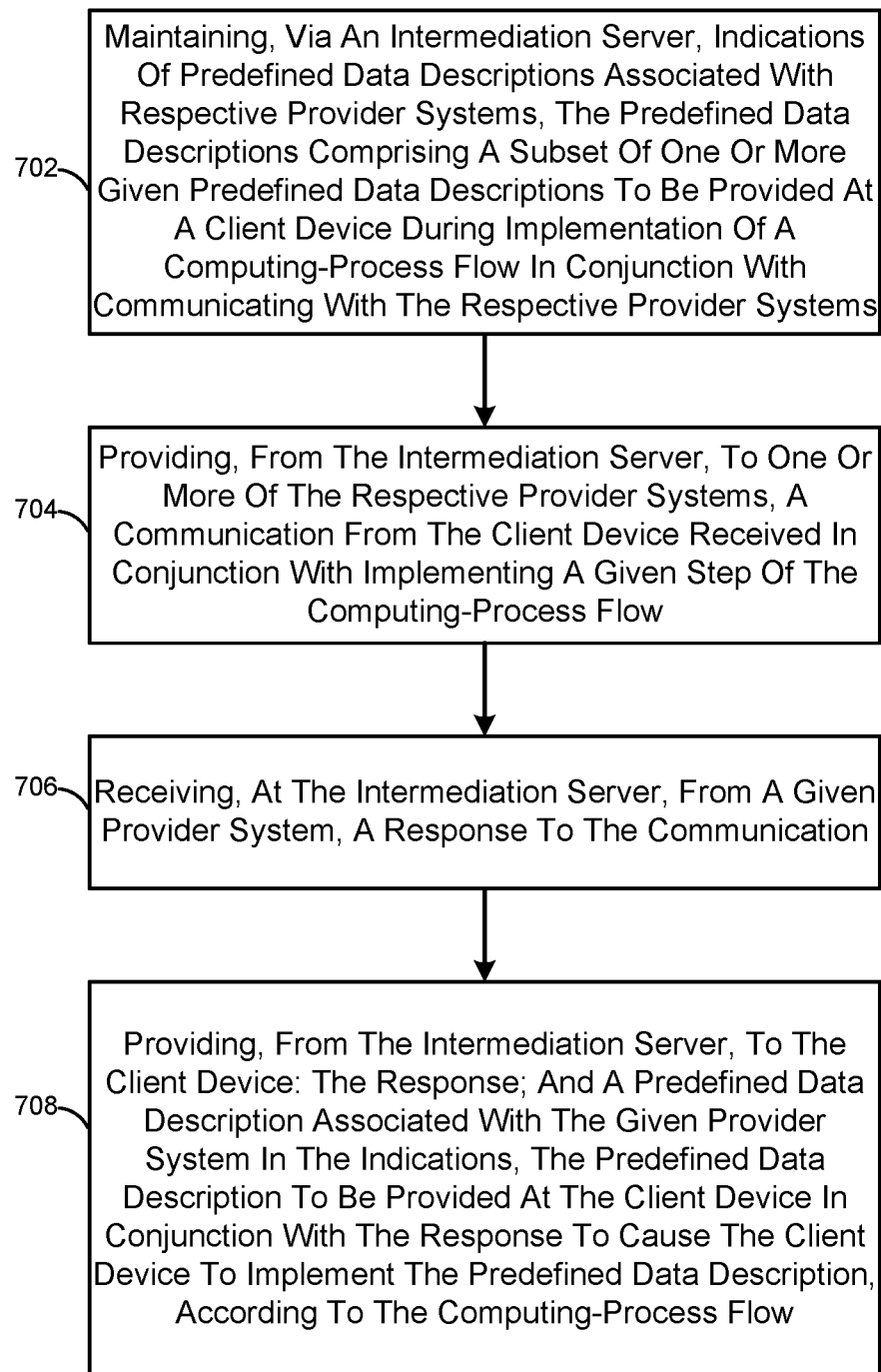
FIG. 7 depicts a method for controlling operation of a client device via an intermediation server according to indications of predefined data descriptions associated with respective provider systems, according to non-limiting examples.

Attention is now directed to FIG. 7 which depicts a flowchart representative of a method 700 a method for controlling operation of a client device via an intermediation server according to indications of predefined data descriptions associated with respective provider systems. The operations of the method 700 of FIG. 7 correspond to machine readable instructions that are executed by the intermediation server 108, and specifically the controller 202 of the intermediation server 108. In the illustrated example, the instructions represented by the blocks of FIG. 7 are stored at the memory 204 for example, as the application 206. The method 700 of FIG. 7 is one way in which the controller 202 and/or the intermediation server 108 and/or the system 100 may be configured. Furthermore, the following discussion of the method 700 of FIG. 7 will lead to a further understanding of the system 100, and its various components.

The method 700 of FIG. 7 need not be performed in the exact sequence as shown and likewise various blocks may be performed in parallel rather than in sequence. Accordingly, the elements of method 700 are referred to herein as "blocks" rather than "steps." The method 700 of FIG. 7 may be implemented on variations of the system 100 of FIG. 1 and FIG. 4, as well.

At a block 702, the controller 202 and/or the intermediation server 108 maintains indications 212 of predefined data descriptions 214 associated with respective provider systems 102, the predefined data descriptions 214 comprising a subset of one or more given predefined data descriptions 214 to be provided at the client device 104 during implementation of the computing-process flow 110 in conjunction with communicating with the respective provider systems 102. However, a subset of the predefined data descriptions 214 may include all of the predefined data descriptions 214 or fewer than all of the predefined data descriptions 214.

At a block 704, the controller 202 and/or the intermediation server 108 provides, to one or more of the respective provider systems 102, a communication from the client device 104 received in conjunction with implementing a given step (e.g. a required step 302) of the computing-process flow 110.

At a block 706, the controller 202 and/or the intermediation server 108 receives, from a given provider system 102, a response to the communication.

At a block 708, the controller 202 and/or the intermediation server 108 provides, to the client device 104: the response; and a predefined data description 214 associated with the given provider system 102 in the indications 212, the predefined data description 214 to be provided at the client device 104 in conjunction with the response to cause the client device 104 to implement the predefined data description, according to the computing-process flow 110.

In some examples, the method 700 may further comprise the controller 202 and/or the intermediation server 108 receiving from the client device 104, in response to providing the predefined data description 214 (e.g. at the block 708), data that has been provided, via the client device 104, at the one or more data fields of the predefined data description 214; and providing, from the intermediation server 108, to the given provider system 102, the data. For example, the data at the given provider system 102, from the client device 104 via the intermediation server 108, may comprise data for booking a service (e.g. date and/or time of an automobile-based pickup service, or an excursion), and which may enable the given provider system 102 to arrange the service.

As has also been mentioned as the client device 104 and the provider systems 102 may communicate according to different formats, the intermediation server 108 may convert between these formats. As such, in these examples, the method 700 may further comprise the controller 202 and/or the intermediation server 108 receiving from the client device 104, in response to providing the predefined data description 214 (e.g. at the block 608), data that has been provided, via the client device 104, at the one or more data fields of the predefined data description 214; converting the data into respective data processable by the given provider system 102; and providing, from the intermediation server 108, to the given provider system 102, the respective data. For example, the data at the given provider system 102, from the client device 104 via the intermediation server 108, may comprise data for booking a service (e.g. date and/or time of an automobile-based pickup service, or an excursion), and which may enable the given provider system 102 to arrange the service but only when the data is converted into respective data (e.g. a respective format) that may be processed by the given provider system 102.

In some examples, the method 700 may further comprise the controller 202 and/or the intermediation server 108 receiving, from a given provider system 102, one or more further indications of one or more new predefined data description 214 of the computing-process flow 110 associated with the given provider system 102; and updating the indications 212 of the predefined data descriptions 214 with the further indications. For example, such an additional aspect of the method 700 may enable the intermediation server 108 to update, or generate, the indications 212, as has previously been described.

Alternatively, and/or in addition, the method 700 may further comprise the controller 202 and/or the intermediation server 108: receiving, from a given provider system 102, one or more further indications of one or more new predefined data description 214 of the computing-process flow 110 associated with the given provider system 102; and, providing the one or more new predefined data descriptions to the client device 104. Hence, for example, when a provider system 102 has a new service that is being offered, when the provider service 102 provides an offer (e.g. of a flight), the provider service 102 may include a new predefined data description with the offer of the flight, which may be received at the intermediation server 108, and provided to the client device 104 with the offer of the flight. The client device 104 may implement the new predefined data description. In such examples, the intermediation server 108 may, or may not, update the indications 212 and store the new predefined data description, accordingly. For example, the new predefined data description may be for a service that is being offered temporarily and/or only for certain offers, and hence the intermediation server 108 may pass on the new predefined data description with offers with which the new predefined data description is received, rather than store the new predefined data description, and update the indications 212. Such examples enable a provider system 102 to offer any suitable services at any suitable time with any suitable offers.

The method 700 will be described in more detail below with respect to FIG. 12, FIG. 13 and FIG. 14.

In particular the methods 600, 700 will next be described independent from one another, though it is understood that aspects of the method 600, 700 may be combined.

Attention is next directed to FIG. 8, FIG. 9, FIG. 10 and FIG. 11 which depict aspects of examples of the method 600. FIG. 8, FIG. 9, FIG. 10 and FIG. 11 are similar to FIG. 4, with like components having like numbers. However, as the method 600 is being described independent of the method 700, at the intermediation server 108 the indications 210 are present, but the indications 212 and the predefined data descriptions 214 are omitted; in other words, in FIG. 8, FIG. 9, FIG. 10 and FIG. 11, the method 600 is described as if the indications 212 and the predefined data descriptions 214 were not present.

Figure 8:
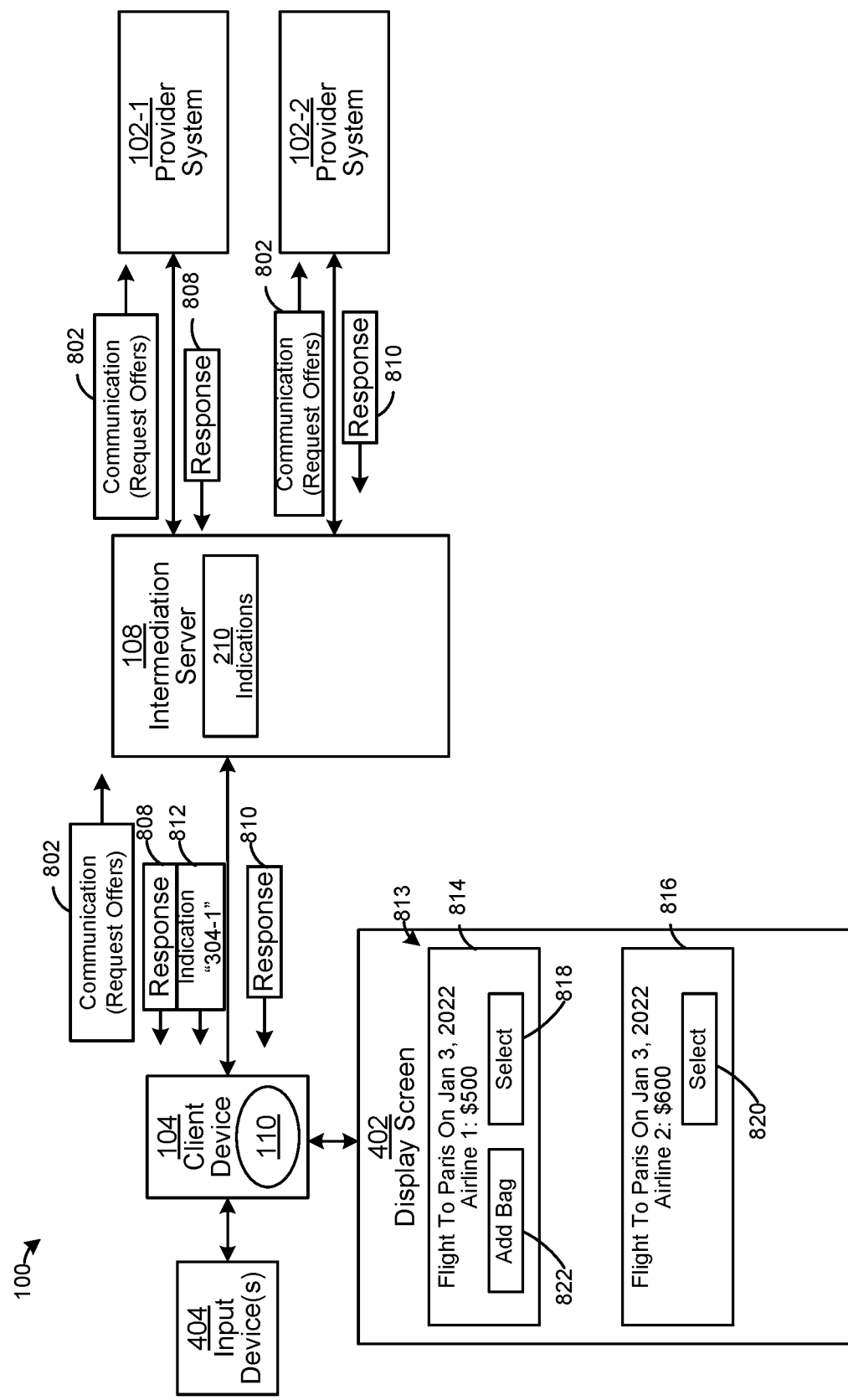
FIG. 8 depicts the system as depicted in FIG. 4 implementing aspects of a method for controlling operation of a client device via an intermediation server according to indications of possible steps associated with respective provider systems, according to non-limiting examples.

With attention first directed to FIG. 8, it is understood that the intermediation server 108 is maintaining (e.g. at the block 602 of the method 600) the indications 210 of the possible steps 304 as described above.

Furthermore, the client device 104 provides a communication 802 to the intermediation server 108, for example to request offers (e.g. "Request Offers") of flights (e.g. provider objects) from one or more of the provider systems 102. Such a request may be provided in conjunction with the client device 104 implementing the required step 302-1 of the computing-process flow 110. The communication 802 may comprise criteria for searching for offers of flights, as described above.

The intermediation server 108 receives the communication 802 and provides (e.g. at the block 604 of the method 600) to the provider systems 102-1, 102-2, a respective communication 802 from the client device 104 (e.g. the communication 802 converted into respective formats compatible with the provider systems 102-1, 102-2) received in conjunction with implementing the first required step 302-1 of the computing-process flow 110.

The intermediation server 108 receives (e.g. at the block 606 of the method 600) from a given provider system 102-1, 102-2, a respective response 808, 810 to the communication 802 For example, each response 808, 810 may comprise a list of offers of flights provided by the respective provider systems 102-1, 102-2 that meet the criteria of the communication 802.

With regards to the response 808 received from the first provider system 102-1. The intermediation server 108 determines that a list of offers of flights indicated by the response 808 will be provided at the client device 104 in conjunction with client device 104 implementing the second required step 302-2. As such, the intermediation server 108 provides (e.g. at the block 608 of the method 600) to the client device 104: the response 808 (e.g. converted into a format compatible with the client device 104); and an indication 812 of the first possible step 304-1 (e.g. in form of an identifier "304-1") associated with the first provider system 102-1 in the indications 210. As has already been explained, the first possible step 304-1 is to be implemented at the client device 104 in conjunction with receiving the response 808 and implementing the computing-process flow 110, for example at the second required step 302-2. In particular, the intermediation server 108 determines that the second required step 302-2 is next being implemented at the client device 104 and the first possible step 304-1 is to be implemented in conjunction with the second required step 302-2; as such, the indication 812 of the first possible step 304-1 is provided to the client device 104 with the response 808.

In contrast, with regards to the response 810 received from the second provider system 102-2, the first possible step 304-1 is not associated with the second provider system 102-1, hence no indication of a possible step is provided with the response 810.

FIG. 8 further depicts the display screen 402 as controlled by the client device 104 implementing the second required step 302-2, in response to receiving the responses 808, 810 and the indication 812. In particular, rendered at the display screen 402 is a GUI 813 showing an offer 814 of a flight provided by the first provider system 102-1, and an offer 816 of a flight provided by the second provider system 102-2. While only one offer 814, 816 is depicted from each of the provider systems 102 for illustrative purposes, it is understood that a plurality of respective offers from the provider systems 102 may be provided as respectively received in the responses 808, 810.

Furthermore, while for illustrative purposes the offers 814, 816 show only certain information associated with a respective flight (e.g. a destination of "Paris", a date of "Jan. 3, 2022" and a respective price of "$500" or "$600"), the offers 814, 816 may show any suitable information received with the responses 808, 810.

The offers 814, 816 are each provided with respective electronic buttons 818, 820 which may be used to select an offer 814, 816 to book for example such selection occurring via the input device 404. Furthermore, when a respective electronic button 818, 820 is selected, the computing-process flow 110 being implemented at the client device 104 is caused to advance to the third required step 302-3 to book a selected offer 814, 816.

With regards to the offer 814, however, as the indication 812 of the first possible step 304-1 was received in conjunction with the response 808 from the first provider system 102-1, the offer 814 is further provided with an electronic button 822 which, when selected, may be used to implement the first possible step 304-1 to add a bag to the offer 814.

Figure 9:
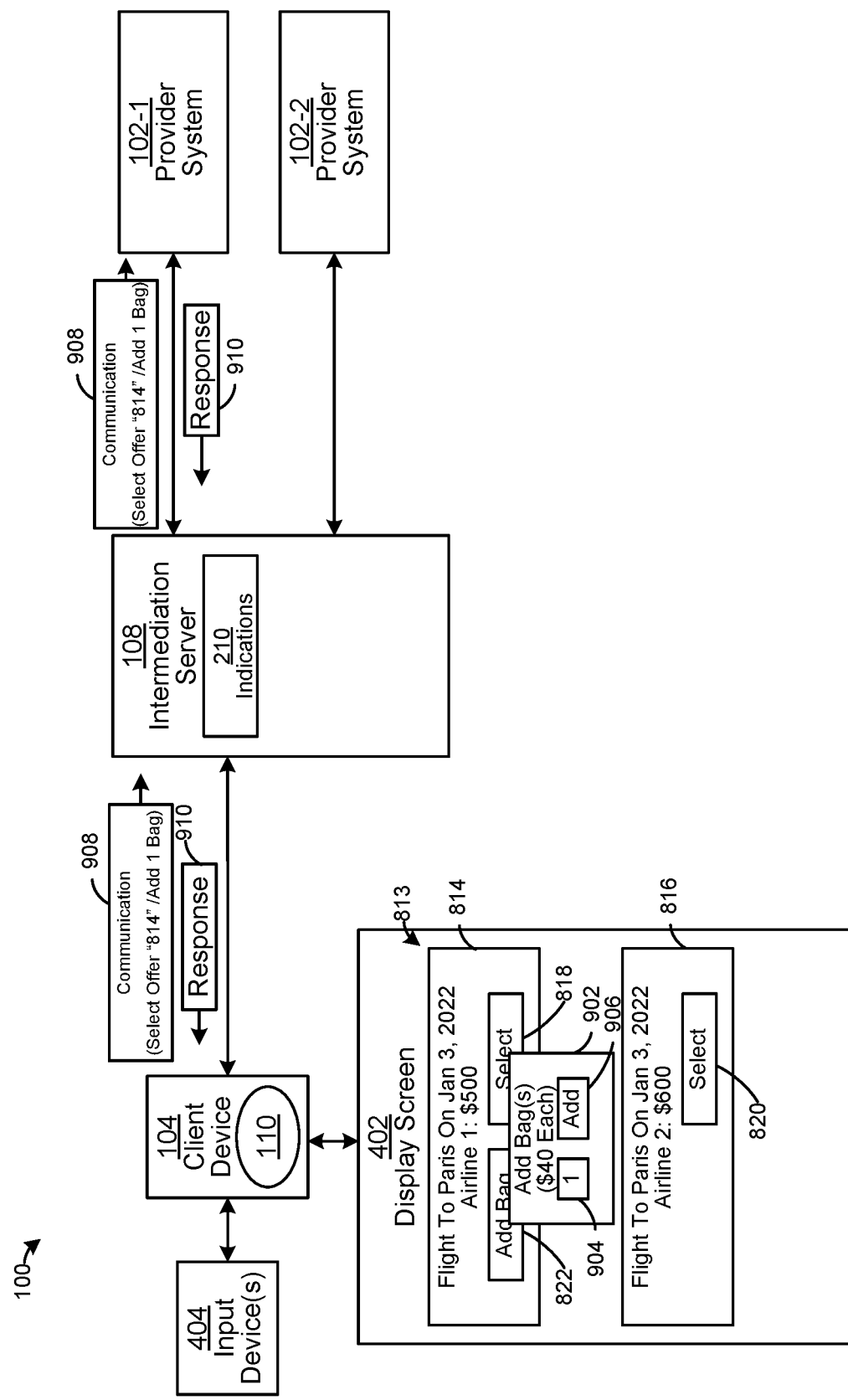
FIG. 9 depicts the system as depicted in FIG. 4 continuing to implement aspects of the method for controlling operation of a client device via an intermediation server according to indications of possible steps associated with respective provider systems, according to non-limiting examples.
Figure 10:
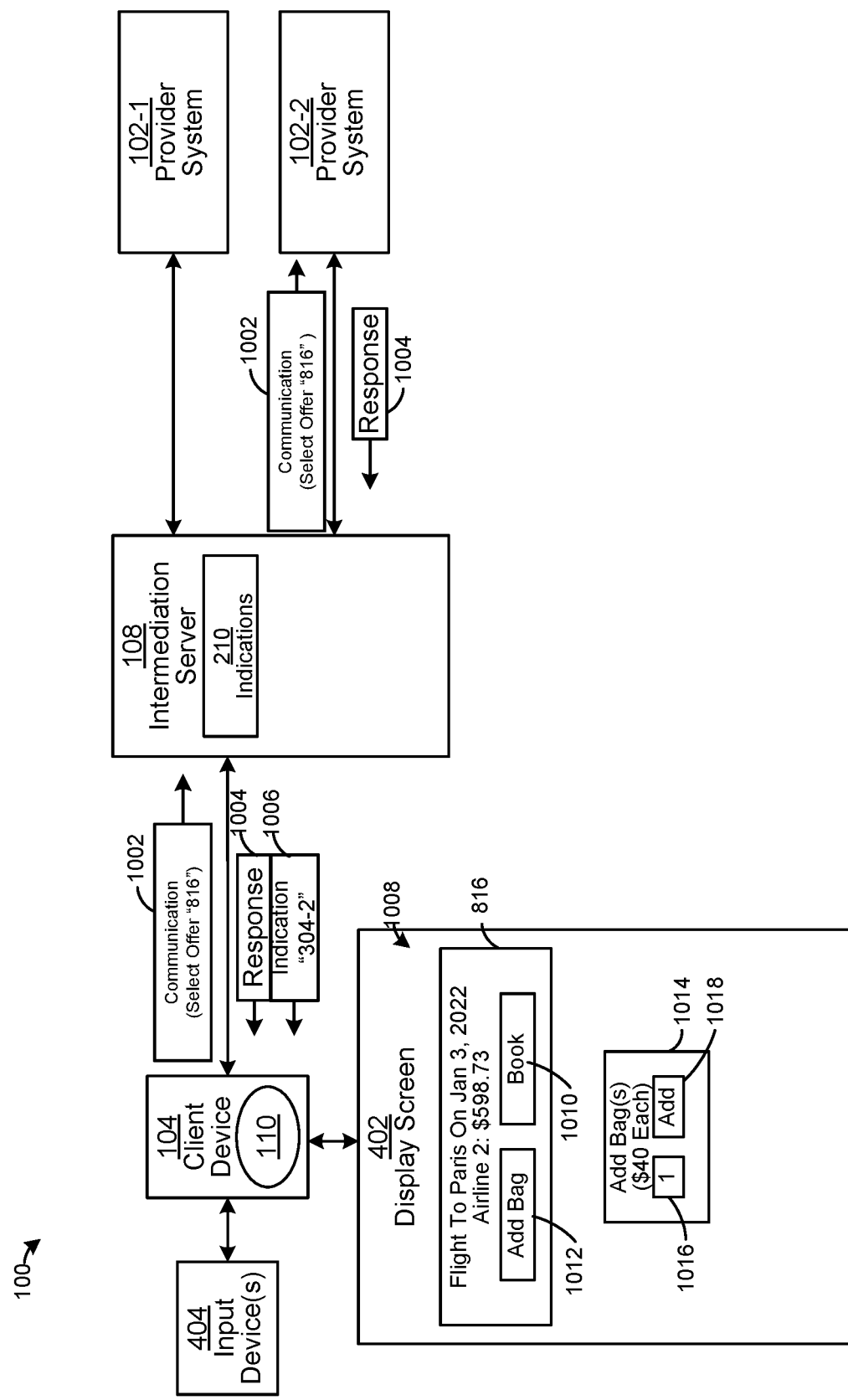
FIG. 10 depicts the system as depicted in FIG. 4 continuing to implement aspects of the method for controlling operation of a client device via an intermediation server according to indications of possible steps associated with respective provider systems, according to non-limiting examples.

For example, with attention next directed to FIG. 9, a GUI 902 (e.g. in the form of a dialogue box on the GUI 813) is provided at the display screen 402, which includes text "Add Bag(s) ($40 Each)", a field (e.g. a data field) 904 for entering a number of bags to add (e.g. as depicted, 1 bag), and an electronic button 906 for causing the number of bags received at the field 904 to be added to the offer 814. Assuming that 1 bag is added to the offer 814, and the electronic button 818 is actuated to select the offer 814, the client device 104 provides to the intermediation server 108, a communication 908 to select the offer 814 and add one bag to the offer 814. The intermediation server 108 provides the communication 908 to the first provider system 102-1 (e.g. converted to a suitable format), which responds with a response 910 for booking offer 814 with one bag added to the offer 814, which the intermediation server 108 provides to the client device 104. While details of the response 910 are not depicted, the response 910 may include updated information for the offer 814, such as an updated price, and the like, and which may be provided at the display screen 402 in conjunction with the required step 302-3 for booking the offer 814. In particular, however, as the second possible step 304-2 is not associated with the first provider system 102-1 at the indications 210, the response 910 is not provided to the client device 104 with an indication similar to the indication 812. While not depicted, it is understood that the client device 104 may then implement the third required step 302-3 and the fourth required step 302-4 to book and pay for the offer 814 as represented by the response 910.

Figure 11:
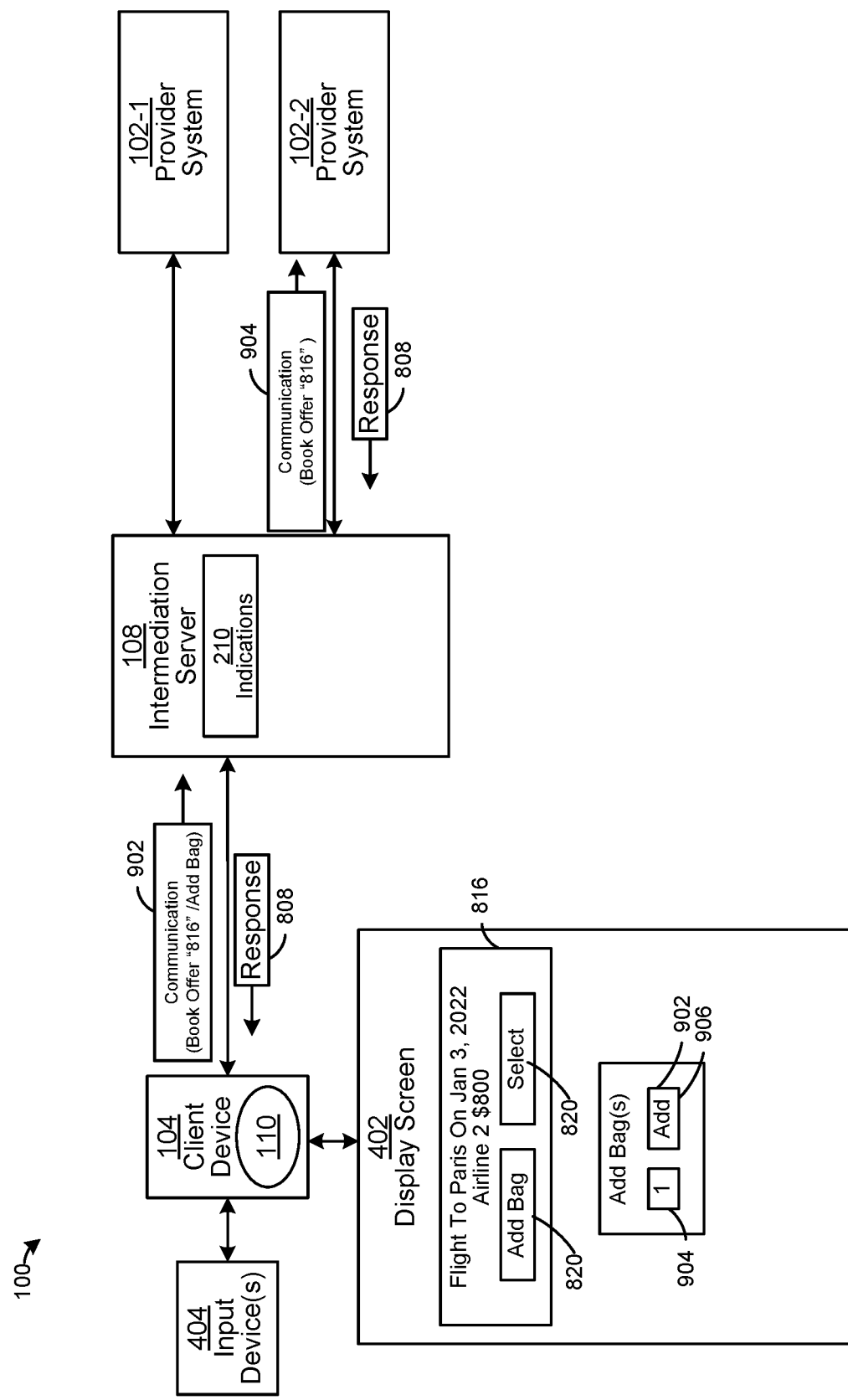
FIG. 11 depicts the system as depicted in FIG. 4 continuing to implement aspects of the method for controlling operation of a client device via an intermediation server according to indications of possible steps associated with respective provider systems, according to non-limiting examples.

Attention is next directed to FIG. 11 which depicts the system 100 when the offer 816 associated with the second provider system 102-2 is selected (e.g. via the electronic button 820) rather than the offer 814 associated with the first provider system 102-1. Hence, for example, the client device 104 provides a communication 1002 indicating the selection of the offer 816 to the intermediation server 108, which provides (e.g. at the block 604 of the method 600) the communication 1002 to the second provider system 102-1, accordingly 1 (e.g. converted to a suitable format). The second provider system 102-2 responds with a response 1004 to for booking the offer 816, which the intermediation server 108 provides (e.g. at the block 608 of the method 600) to the client device 10, along with an indication 1006 of the second possible step 304-2 (e.g. in form of an identifier "304-2") associated with the second provider system 102-2 in the indications 210. As has already been explained, the second possible step 304-2 is to be implemented at the client device 104 in conjunction with receiving the response 1004 and implementing the computing-process flow 110, for example at the third required step 302-3.

Hence, as depicted, the client device 104 provides a GUI 1008 at the display screen 402 in conjunction with implementing the third required step 302-3 for booking the offer 816 as updated via the response 1004, for example to show a more precise cost for the offer 816 (e.g. "$598.73") received with the response 1004, and further includes an electronic button 1010 for booking the offer 816.

However, as the indication 1006 of the second possible step 304-2 was received in conjunction with the response 1004 from the second provider system 102-2, the updated offer 816 is further provided with an electronic button 1012 which, when selected, may be used to add a bag to the offer 816 via the second possible step 304-2 being implemented. For example, as depicted, when the electronic button 1012 is selected, a GUI 1014 (e.g. in the form of a dialogue box on the GUI 1008) is provided at the display screen 402, which is similar to the GUI 902, and includes a field 1016 similar to the field 904, and an electronic button 1018 similar to the electronic button 906. Hence, once a bag is added to the offer 816 (e.g. via actuation of the electronic button 1018), the electronic button 1010 may be actuated to cause an updated price to be provided (e.g. that includes the added bag, and which may involve further communications and responses with the intermediation server 108 and the second provider system 102-2) so that the fourth required step 302-4 may be implemented to pay for the offer 816, with one bag added.

Figure 12:
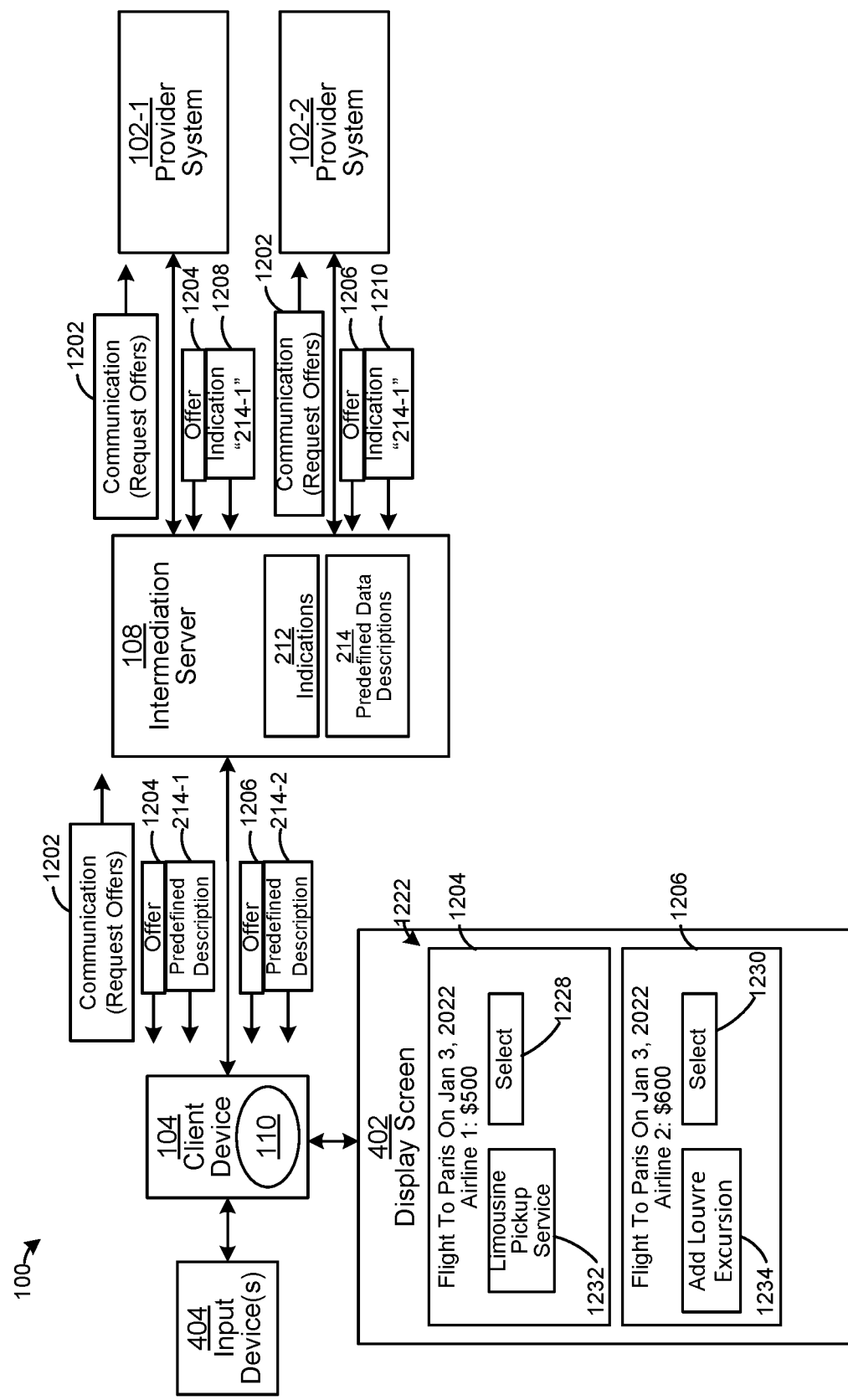
FIG. 12 depicts the system as depicted in FIG. 4 implementing aspects of method for controlling operation of a client device via an intermediation server according to indications of predefined data descriptions associated with respective provider systems, according to non-limiting examples.
Figure 13:
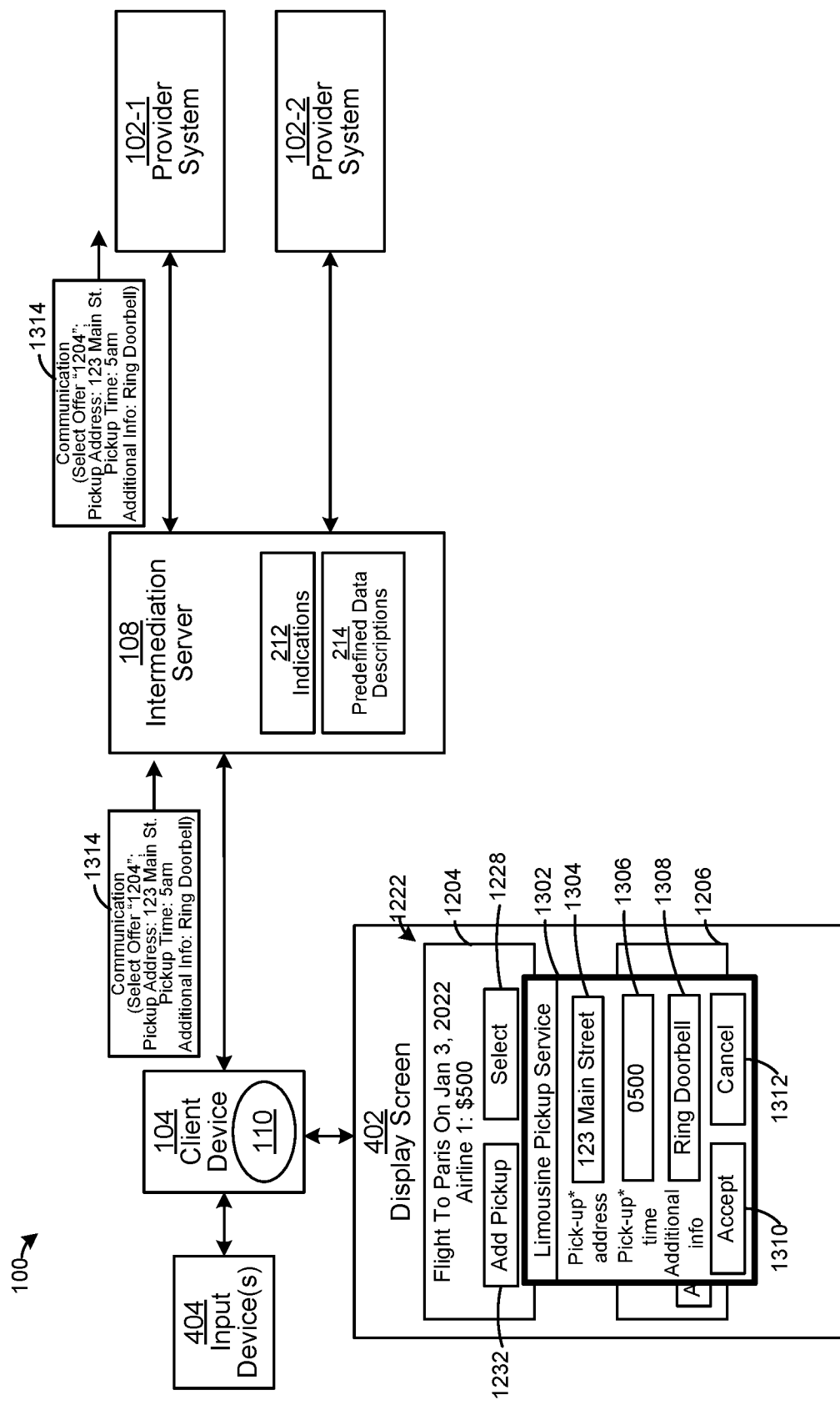
FIG. 13 depicts the system as depicted in FIG. 4 continuing to implement aspects of the method for controlling operation of a client device via an intermediation server according to indications of predefined data descriptions associated with respective provider systems, according to non-limiting examples.
Figure 14:
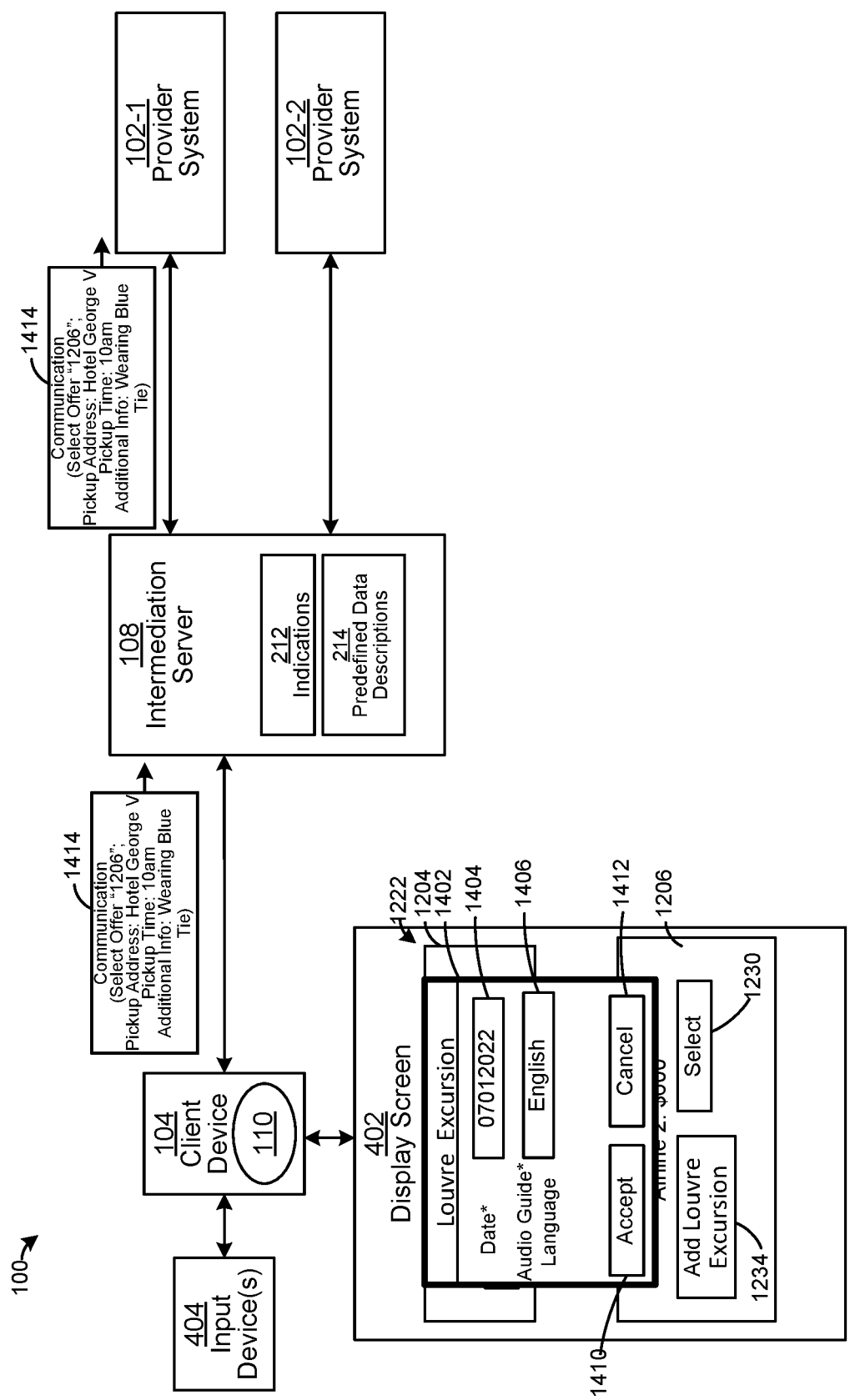
FIG. 14 depicts the system as depicted in FIG. 4 continuing to implement aspects of the method for controlling operation of a client device via an intermediation server according to indications of predefined data descriptions associated with respective provider systems, according to non-limiting examples.

Attention is next directed to FIG. 12, FIG. 13 and FIG. 14 which depicts aspects of examples of the method 700. FIG. 12, FIG. 13 and FIG. 14 are similar to FIG. 4, with like components having like numbers. However, as the method 700 is being described independent of the method 600, at the intermediation server, the indications 212 and the predefined data descriptions 214 are present but the indications 210 are omitted; in other words, in FIG. 12, FIG. 13 and FIG. 14, the method 700 is described as if the indications 210 were not present.

With attention first directed to FIG. 12, it is understood that the intermediation server 108 is maintaining (e.g. at the block 702 of the method 700) the indications 212 of the predefined data descriptions 214, as described above.

Furthermore, the client device 104 provides a communication 1202 to the intermediation server 108, for example to request offers (e.g. "Request Offers") of flights (e.g. provider objects) from one or more of the provider systems 102. Such a request may be provided in conjunction with the client device 104 implementing the required step 302-1 of the computing-process flow 110. The communication 1202 may comprise criteria for searching for offers of flights, as described above.

The intermediation server 108 receives the communication 1202 and provides (e.g. at the block 704 of the method 700) to the provider systems 102-1, 102-2, a respective communication 1202 from the client device 104 (e.g. the communication 1202 converted into respective formats compatible with the provider systems 102-1, 102-2) received in conjunction with implementing the first required step 302-1 of the computing-process flow 110.

The intermediation server 108 receives (e.g. at the block 706 of the method 700) from a given provider system 102-1, 102-2, a respective response to the communication 1202, for example in the form of specific offers 1204, 1206 that are further transmitted with respective indications 1208, 1210 of predefined data descriptions 214 associated with each offer 1204, 1206 (e.g. respective identifiers "214-1" and "214-2"). While as will presently be described, the offers 1204, 1206 represent flights that meet the criteria of the communication 1202, the offers 1204, 1206 may be part of a list of offers of flights provided by the respective provider systems 102-1, 102-2 that meet the criteria of the communication 1202. For illustrative purposes, the offers 1204, 1206 are depicted as being respectively the same as the offers 814, 816.

With respect to the offer 1204, the associated indication 1208 indicates that the predefined data description 214-1 may be provided to the client device 104 with the offer 1204. Hence, the intermediation server 108 provides (e.g. at the block 708 of the method 700) to the client device 104 the response to the communication 1202, received from the first provider system 102-1 in the form of the offer 1204, with the predefined data description 214-1. In particular, as the predefined data description 214-1 is mapped to the identifier "214-1" received with the offer 1204, the intermediation server 108 retrieves the predefined data description 214-1 from the memory 204 and provides the predefined data description 214-1 to the client device 104 with the offer 1204.

Similarly, with respect to the offer 1206 the associated indication 1210 indicates that the predefined data description 214-2 may be provided to the client device 104 with the offer 1206. Hence, the intermediation server 108 provides (e.g. at the block 708 of the method 700) to the client device 104 the response to the communication 1202, received from the second provider system 102-2 in the form of the offer 1206, with the predefined data description 214-2. In particular, as the predefined data description 214-2 is mapped to the identifier "214-2" received with the offer 1206, the intermediation server 108 retrieves the predefined data description 214-2 from the memory 204 and provides the predefined data description 214-2 to the client device 104 with the offer 1206.

FIG. 12 further depicts the display screen 402 as controlled by the client device 104 implementing the second required step 302-2, in response to receiving the offers 1204, 1206. In particular, rendered at the display screen 402 is a GUI 1222 showing the offer 1204 of a flight provided by the first provider system 102-1, and the offer 1206 of a flight provided by the second provider system 102-2. While only one offer 1204, 1206 is depicted from each of the provider systems 102 for illustrative purposes, it is understood that a plurality of respective offers from the provider systems 102 may be provided.

Each of the offers 1204, 1206 are furthermore depicted with respective electronic buttons 1228, 1230 respectively similar to the electronic buttons 818, 820 and hence functionality of the electronic buttons 1228, 1230 is understood to be similar to the electronic buttons 818, 820 described herein.

As the offer 1204 was received with the predefined data description 214-1, the offer 1204 is further provided at the GUI 1222 with an electronic button 1232 for adding a limousine (e.g. automobile-based) pickup service to the offer 1204. The client device 104 may be configured, in these examples to add such an electronic button when a predefined data description 214 is received with an offer. In particular. The electronic button 1232 may be labelled with the header information of the predefined data description 214-1 (e.g. as depicted in FIG. 5).

Similarly, as the offer 1206 was received with the predefined data description 214-1, the offer 1206 is further provided at the GUI 1222 with an electronic button 1234 for adding an excursion to the Louvre Museum to the offer 1206. The electronic button 1234 may be labelled with the header information of the predefined data description 214-2 (e.g. as depicted in FIG. 5).

Attention is next directed to FIG. 13 which depicts the system 100 when the electronic button 1232 is actuated. In particular, when the electronic button 1232 is actuated (e.g. via the input device 404), the client device 104 processes the predefined data description 214-1 and generates a GUI 1302 (e.g. as a dialog box proved on the GUI 1222) that includes fields 1304, 1306, 1306 (e.g. data fields) defined by the predefined data description 214-1. The header information of the predefined data description 214-1 is provided in a header of the GUI 1222. Furthermore, the fields 1304, 1306, 1308 respectively correspond to the lines of data (e.g. (Location, String, True, "Pickup address") (Time, TimeHHMM, True, "Pickup time") (AddlInfo, String, False, "Additional info")) of the predefined data description 214-1, and are labelled with respective text from such lines. The fields 1304, 1306 are understood to be non-optional and/or mandatory to be filled in, as per the text "True" in the lines of data of the predefined data description 214-1, as indicated by an asterisk ("*") adjacent the fields 1304, 1306. As depicted, the fields 1304, 1306 have been filled in (e.g. using the input device 404) to respectively indicate a pickup address (e.g. "123 Main St."), a time (e.g. "0500" in the required format), and the optional field 1308 has been filled in to include additional information (e.g. "Ring Doorbell"). As depicted, the GUI 1302 further includes an electronic button 1310 to accept the data in the fields 1304, 1306, 1308, which, when actuated, may return the display screen 402 to the GUI 1222, where the electronic button 1228 may be actuated to select the offer 1204. While not depicted, if the mandatory fields 1304, 1306 are not filled in (and/or not filled in according to a given format) an error message may be provided allowing the mandatory fields 1304, 1306 may be edited, accordingly. Alternatively, as depicted, the GUI 1302 may further include an electronic button 1312 to cancel the service indicated by the GUI 1302.

As depicted, however, it is understood that the fields 1304, 1306, 1308 were filled in as depicted, and the electronic buttons 1310, 1228 were actuated, to cause the client device 104 to provide, to the intermediation server 108, a communication 1314 that includes the data that has been provided at the fields 1304, 1306, 1308, for example in conjunction with selecting the offer 1204. The intermediation server 108 receives the communication 1314 with the data, for example, in response to providing the predefined data description 214-1 to the client device 104, and provides the communication 1314 with the data to the first provider system 102-1. As previously described, the intermediation server 108 may convert the data of the communication 1314 into respective data processable by the first provider system 102-1 prior to providing the communication 1314 to the first provider system 102-1. Regardless, the communication 1314 with the data may enable the first provider system 102-1 to provide an updated offer (e.g. with an updated price reflecting the limousine pickup service added to the offer 1204) and book the limousine service, presuming the offer 1204 is booked and paid for.

Attention is next directed to FIG. 14 which depicts the system 100 when the electronic button 1234 is actuated. In particular, when the electronic button 1234 is actuated (e.g. via the input device 404), the client device 104 processes the predefined data description 214-2 and generates a GUI 1402 (e.g. as a dialog box proved on the GUI 1222) that includes fields 1404, 1406, 1406 (e.g. data fields) defined by the predefined data description 214-2. The header information of the predefined data description 214-2 is provided in a header of the GUI 1222. Furthermore, the fields 1404, 1406 respectively correspond to the lines of data (e.g. (EventDate, DateDDMMYYYY, True, "Date") (GuideLanguage, String, True, "Audioguide Language")) of the predefined data description 214-2, and are labelled with respective text from such lines. The fields 1404, 1406 are understood to be non-optional and/or mandatory to be filled in, as per the text "True" in the lines of data of the predefined data description 214-2, as indicated by an asterisk ("*") adjacent the fields 1404, 1406. As depicted, the fields 1404, 1406 have been filled in (e.g. using the input device 404) to respectively indicate a date (e.g. "07012022" in the required format), and an audioguide language a time (e.g. "English"). As depicted, the GUI 1402 further includes an electronic button 1410 to accept the data in the fields 1404, 1406, which, when actuated, may return the display screen 402 to the GUI 1222, where the electronic button 1230 may be actuated to select the offer 1206. While not depicted, if the mandatory fields 1404, 1406 are not filled in (and/or not filled in according to a given format) an error message may be provided allowing the mandatory fields 1404, 1406 may be edited, accordingly. Alternatively, as depicted, the GUI 1402 may further include an electronic button 1412 to cancel the service indicated by the GUI 1402.

As depicted, however, it is understood that the fields 1404, 1406 were filled in as depicted, and the electronic buttons 1410, 1230 were actuated, to cause the client device 104 to provide, to the intermediation server 108, a communication 1414 that includes the data that has been provided at the fields 1404, 1406, for example in conjunction with selecting the offer 1206. The intermediation server 108 receives the communication 1414 with the data, for example, in response to providing the predefined data description 214-2 to the client device 104, and provides the communication 1414 with the data to the second provider system 102-2. As previously described, the intermediation server 108 may convert the data of the communication 1414 into respective data processable by the second provider system 102-2 prior to providing the communication 1414 to the second provider system 102-2. Regardless, the communication 1414 with the data may enable the second provider system 102-2 to provide an updated offer (e.g. with an updated price reflecting the limousine pickup service added to the offer 1206) and book the limousine service, presuming the offer 1206 is booked and paid for.

While the method 700 is described in FIG. 12, FIG. 13 and FIG. 14 as being implemented in conjunction with the second required step 302-2, it is understood that the method 700 may be implemented with any other suitable required step 302. For example, alternatively, and/or in addition, the method 700 may be implemented in conjunction with the third required step 302-3, such that a respective predefined data descriptions 214 may be provided when booking an offer (e.g. rather than selecting an offer), and/or when a respective predefined data description 214 was provided to the client device 104 in conjunction with selecting an offer, but an associated service was not selected for booking (e.g. as depicted in FIG. 12, FIG. 13 and FIG. 14), the respective predefined data description 214 may again be provided to the client device 104 in conjunction with booking an offer.

While the methods 600, 700 have been descried as independent from each other, it is understood that aspects of the methods 600, 700 may be combined. For example, attention is next directed to FIG. 15 which depicts the display screen 402 showing the GUI 813, similar to as depicted in FIG. 8, but assuming that the indications 1208, 1210 of FIG. 12 were returned from the provider systems 102-1 such that the predefined data descriptions 214-1, 214-2 were received at the client device 104 with the responses 808, 810 and/or the offers 814, 816 which are understood to be the same as the offers 1204, 1206. As depicted the GUI 813 has been adapted to include the electronic buttons 1232, 1234 at the respective offers 814, 816 which, when actuated, may cause the GUIs 1302, 1402 to be respectively provided. Similarly, the GUI 813 includes the offer 814 as rendered at the GUI 813 that includes the electronic button 822 to add a bag which, when actuated, may cause the GUI 902 to be provided. Such, when the methods 600, 700 are combined, the client device 104 may be controlled to implement certain possible steps 304 as well as implement certain predefined data descriptions 214. Put another way, a communication from the client device 104 to the intermediation server 108 include both the data of the communication 908 and the data of the communication 1314.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
maintaining, via an intermediation server, indications of possible steps associated with respective provider systems, the possible steps comprising a subset of one or more given possible steps of a computing-process flow implemented at a client device in conjunction with communicating with the respective provider systems, the computing-process flow comprising one or more required steps and the one or more given possible steps, wherein a given indication indicates one or more respective possible steps associated with a given provider system and a given required step, and different subsets of the one or more possible steps are associated with different provider systems;
providing, from the intermediation server, to one or more of the provider systems, a communication from the client device received in conjunction with implementing the given required step of the computing-process flow;
receiving, at the intermediation server, from the given provider system, a response to the communication; and
providing, from the intermediation server, to the client device:
the response; and
an indication of the one or more respective possible steps associated with the given provider system in the indications, the one or more respective possible steps for implementation at the client device in conjunction with receiving the response and implementing the given required step of the computing-process flow, wherein the indication of the one or more respective possible steps associated with the given provider system modifies a graphic user interface (GUI) associated with the required step to add one or more electronic buttons to the GUI, the one or more electronic buttons for implementing the one or more respective possible steps for the given provider system, the one or more GUI features unavailable for other provider systems in the GUI.

2. The method of claim 1, wherein the computing-process flow comprises an Applications Programming Interface (API) flow.

3. The method of claim 1, wherein the indications of the possible steps are one or more of defined and stored at a memory available to the server.

4. The method of claim 1, wherein the indications of the possible steps comprise indicators indicating which of the one or more possible next steps to implement in the computing-process flow at the client device.

5. The method of claim 1, wherein the intermediation server comprises an aggregator server.

6. The method of claim 1, wherein associated possible steps for a respective provider system depend on the given step of the computing-process flow.

7. The method of claim 1, further comprising:
receiving, at the intermediation server, from the given provider system, one or more further indications of one or more other possible steps of the computing-process flow associated with the given provider system; and
updating the indications of the possible steps with the further indications.

8. The method of claim 1, wherein one or more of the intermediation server, and one or more of the provider systems, operate according to New Distribution Capability (NDC) standard.

9. The method of claim 1, wherein the indication of the one or more respective possible steps associated with the given provider system modifies the GUI to add the one or more electronic buttons according to predefined data associated with the given provider system.

10. A server comprising:
a communication interface;
a controller; and
a computer-readable storage medium having stored thereon computer-readable program code that, when executed by the controller, causes the controller to perform a method comprising:
maintaining indications of possible steps associated with respective provider systems, the possible steps comprising a subset of one or more given possible steps of a computing-process flow implemented at a client device in conjunction with communicating with the respective provider systems, the computing-process flow comprising one or more required steps and the one or more given possible steps, wherein a given indication indicates one or more respective possible steps associated with a given provider system and a given required step, and different subsets of the one or more possible steps are associated with different provider systems;
providing to one or more of the provider systems, a communication from the client device received in conjunction with implementing the given required step of the computing-process flow;
receiving, from a given provider system, a response to the communication; and
providing, via the communication interface, to the client device:
the response; and
an indication of the one or more respective possible steps associated with the given provider system in the indications, the one or more respective possible steps for implementation at the client device in conjunction with receiving the response and implementing the given required step of the computing-process flow, wherein the indication of the one or more respective possible steps associated with the given provider system modifies a graphic user interface (GUI) associated with the required step to add one or more electronic buttons to the GUI, the one or more electronic buttons for implementing the one or more respective possible steps for the given provider system, the one or more GUI features unavailable for other provider systems in the GUI.

11. The server of claim 10, wherein the computing-process flow comprises an Applications Programming Interface (API) flow.

12. The server of claim 10, wherein the indications of the possible steps are one or more of defined and stored at a memory available to the server.

13. The server of claim 10, wherein the indications of the possible steps comprise indicators indicating which of the one or more possible next steps to implement in the computing-process flow at the client device.

14. The server of claim 10, further comprising an aggregator server.

15. The server of claim 10, wherein associated possible steps for a respective provider system depend on the given step of the computing-process flow.

16. The server of claim 10, wherein the method further comprises:
receiving, from the given provider system, one or more further indications of one or more other possible steps of the computing-process flow associated with the given provider system; and
updating the indications of the possible steps with the further indications.

17. The server of claim 10, wherein one or more of the server, and one or more of the provider systems, operate according to New Distribution Capability (NDC) standard.

18. The server of claim 10, wherein the indication of the one or more respective possible steps associated with the given provider system modifies the GUI to add the one or more electronic buttons according to predefined data associated with the given provider system.

* * * * *